United States Patent
Park

(10) Patent No.: US 10,349,585 B2
(45) Date of Patent: Jul. 16, 2019

(54) PLANT CULTIVATION EQUIPMENT USING UP-DOWN SYSTEM

(71) Applicants: GREEN PLUS CO., LTD., Yesan-gun (KR); Yeong Hwan Park, Pyeongtaek-si (KR)

(72) Inventor: Yeong Hwan Park, Pyeongtaek-si (KR)

(73) Assignees: Yeong Hwan Park, Pyeongtaek (KR); GREEN PLUS CO., LTD., Yesan-Gun (KR)

( * ) Notice: Subject to any disclaimer, the term of this patent is extended or adjusted under 35 U.S.C. 154(b) by 261 days.

(21) Appl. No.: 15/597,673

(22) Filed: May 17, 2017

(65) Prior Publication Data
US 2018/0242536 A1    Aug. 30, 2018

(30) Foreign Application Priority Data

Feb. 27, 2017 (KR) .......................... 10-2017-0025429
Mar. 23, 2017 (KR) .......................... 10-2017-0036688

(51) Int. Cl.
*A01G 9/02* (2018.01)
*A01G 9/14* (2006.01)
*A01G 9/04* (2006.01)

(52) U.S. Cl.
CPC ............. *A01G 9/024* (2013.01); *A01G 9/143* (2013.01); *A01G 9/047* (2013.01); *Y02A 40/252* (2018.01)

(58) Field of Classification Search
CPC . A01G 9/00; A01G 9/02; A01G 9/023; A01G 9/14; A01G 9/1476; A01G 9/024; A01G 9/047
See application file for complete search history.

(56) References Cited

U.S. PATENT DOCUMENTS

| 6,848,877 | B2* | 2/2005 | Hendriks | A01G 9/143 414/281 |
| 2003/0223850 | A1* | 12/2003 | Hendriks | A01G 9/143 414/626 |
| 2015/0319936 | A1* | 11/2015 | Park | A01G 9/14 47/17 |

FOREIGN PATENT DOCUMENTS

| JP | 2005013047 A | * | 1/2005 |
| JP | 2006-199339 A | | 8/2006 |
| KR | 10-1483391 B1 | | 1/2015 |

* cited by examiner

*Primary Examiner* — Monica L Williams
*Assistant Examiner* — Aaron M Rodziwicz
(74) *Attorney, Agent, or Firm* — STIP Law Group, LLC

(57) ABSTRACT

The present invention relates a plant cultivation apparatus using an up-down system enabling mass production of plants by allowing the entire area of a greenhouse to be used as a cultivation space.
The plant cultivation apparatus using the up-down system includes a driving unit 20 installed at trusses 12 installed at regular intervals in a forward and backward direction to horizontally cross tops of inner pillars 11 of a greenhouse 10 and including a deceleration motor 21, a drive shaft 22, driving sprocket members 23 installed at the drive shaft at regular intervals in the forward and backward direction and including first to fifth sprockets 231 to 235, and first to fourth left and right auxiliary sprockets 241 to 244 installed to be adjacent to left and right sides of the second to fifth sprockets respectively, an elevating unit 30 operably installed by the driving unit 20 including first to fifth elevating members 31 to 35, and left and right cultivation gutters 40 and 40' ascending and descending in a state of being coupled to left and right ends of the first to fifth elevating members respectively. The left and right cultivation gutters of the first to third elevating members simulta- (Continued)

neously ascend and descend alternately in turn by using one deceleration motor and one driving shaft.

7 Claims, 22 Drawing Sheets

[FIG. 1]
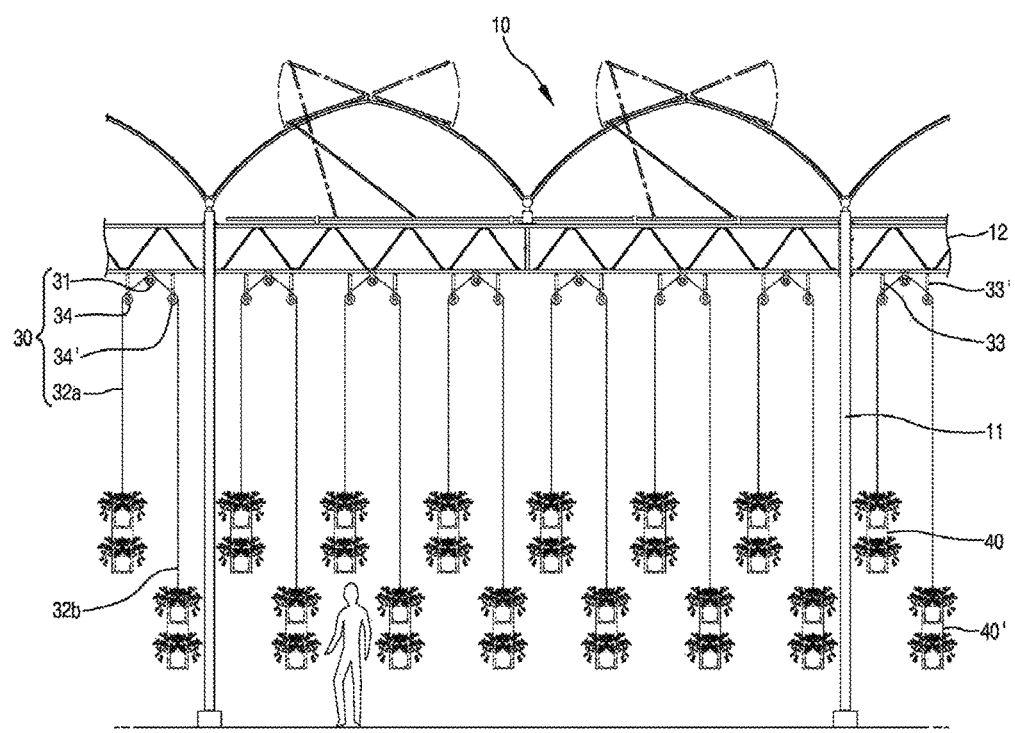

[FIG. 2]
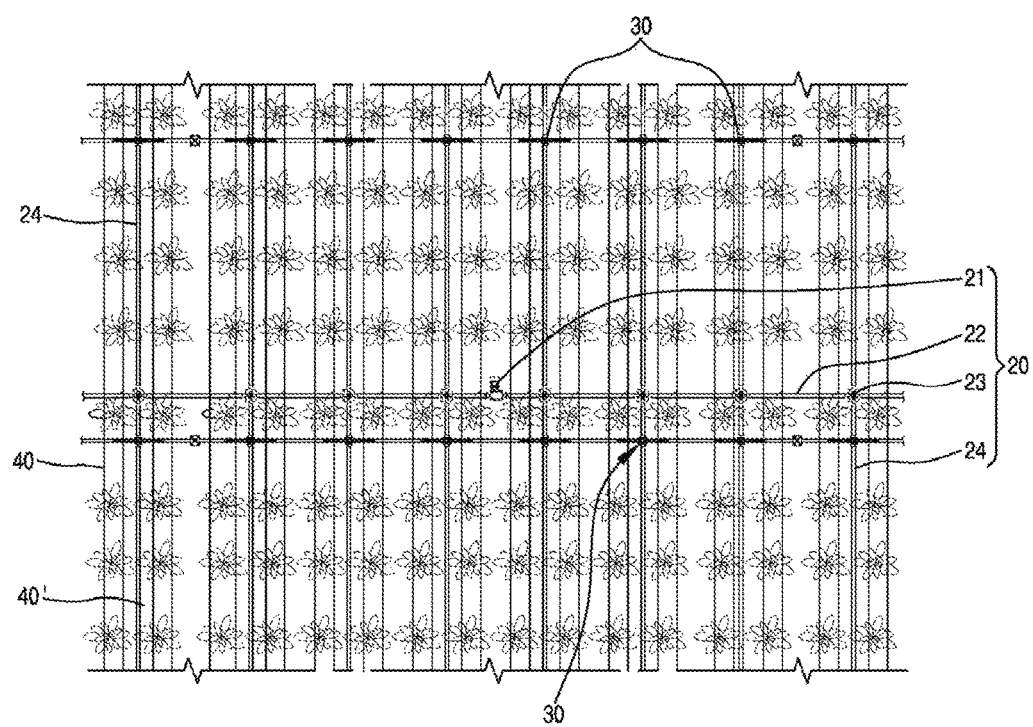

[FIG. 3]
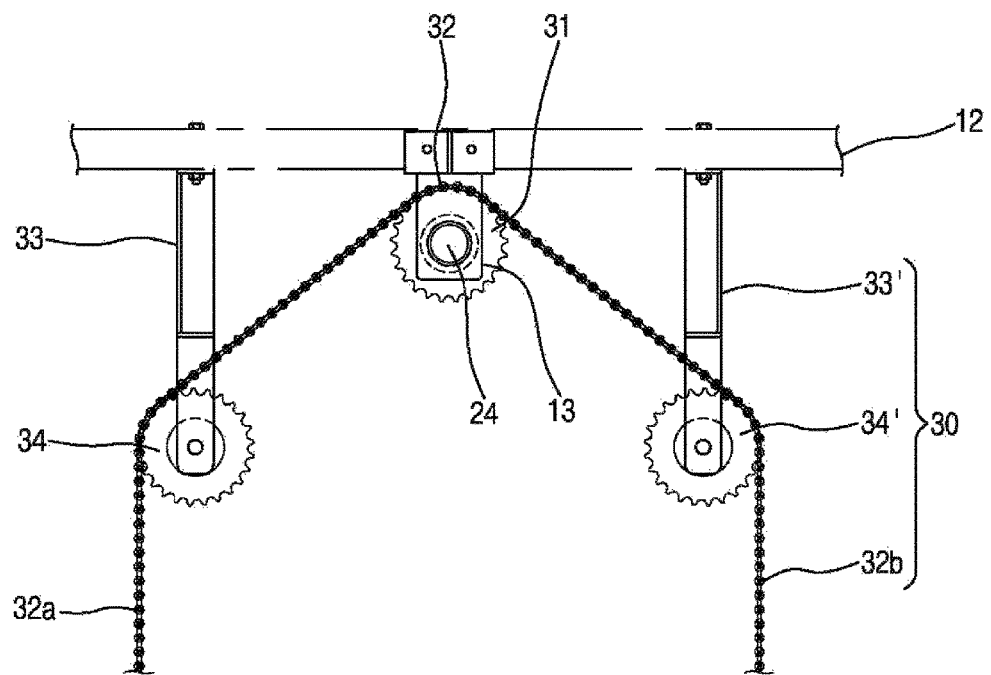

[FIG. 4]
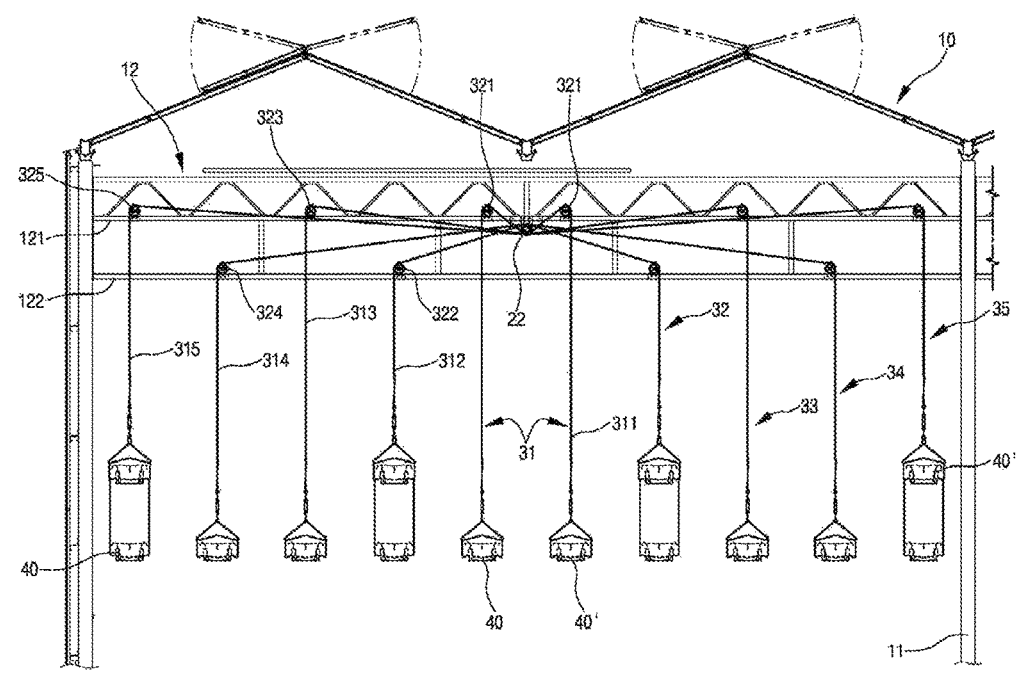

[FIG. 5]
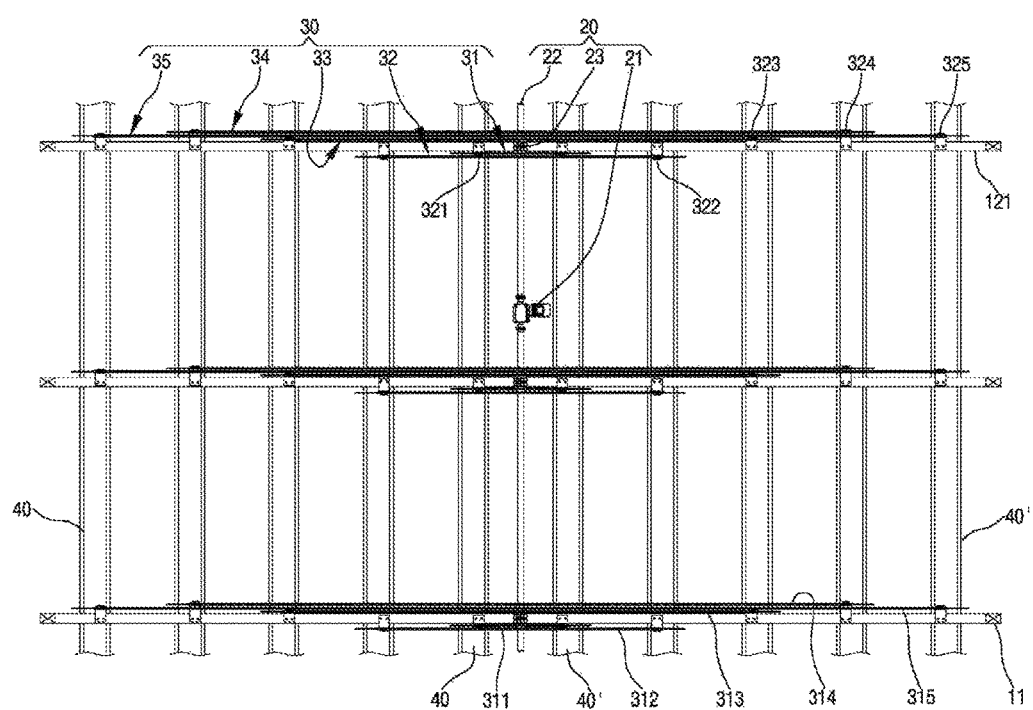

[FIG. 6]
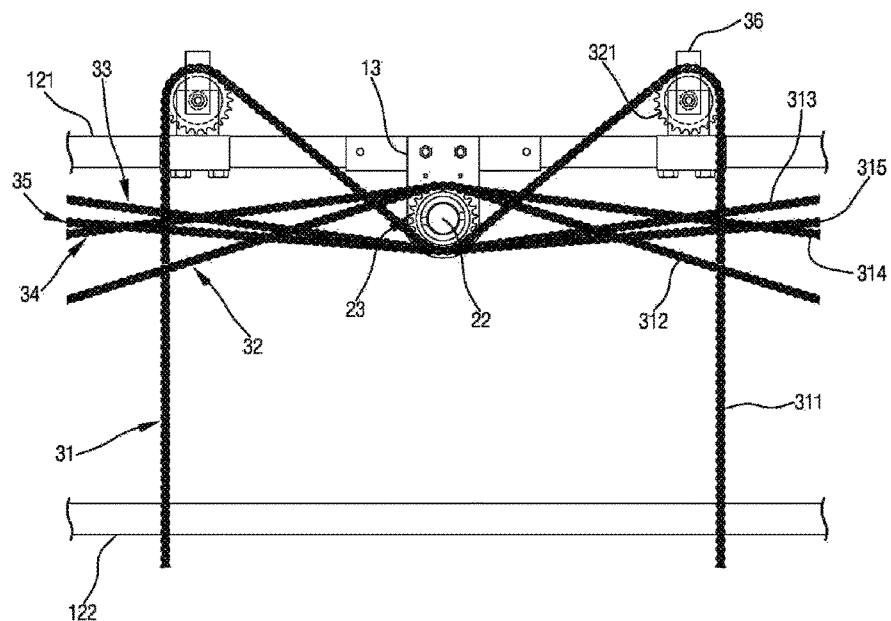
[FIG. 7A]
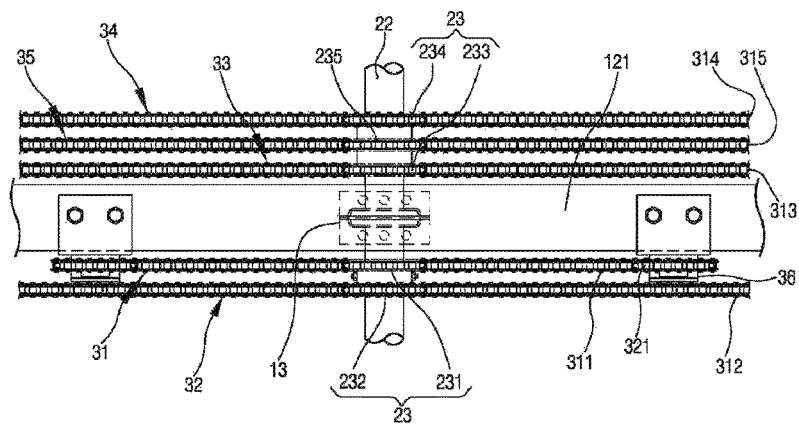

[FIG. 7B]
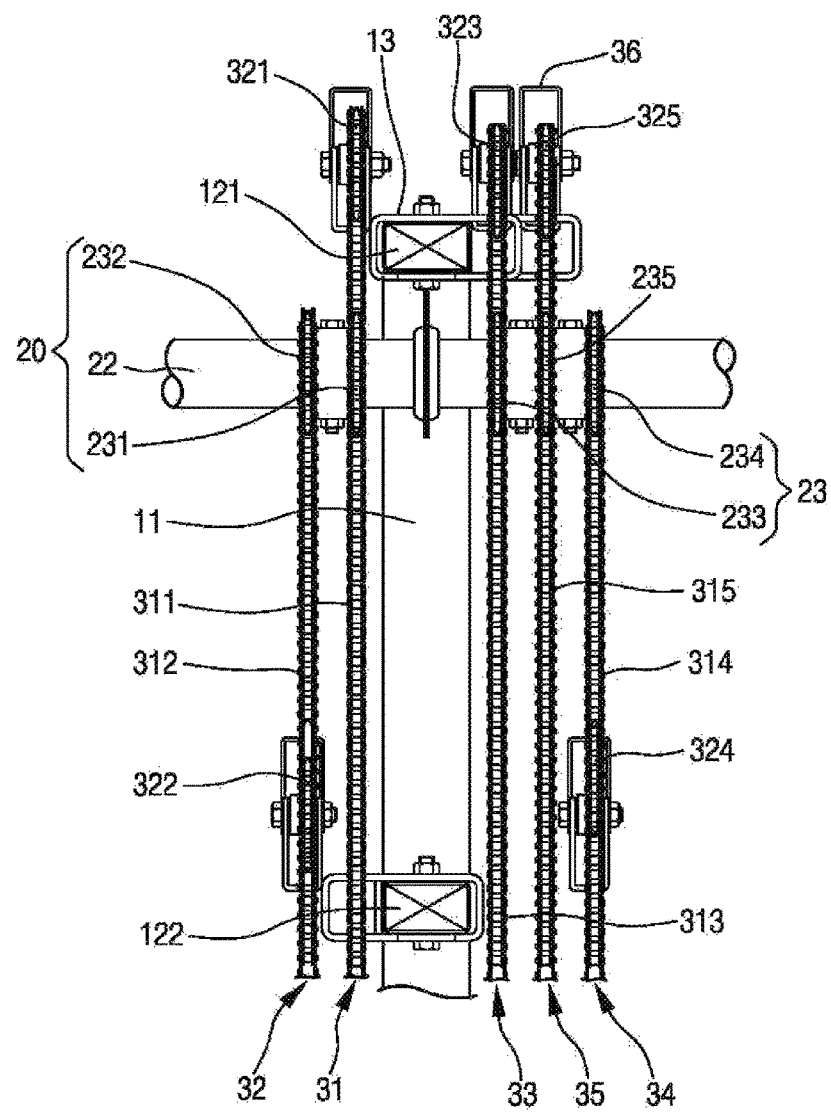

[FIG. 8]
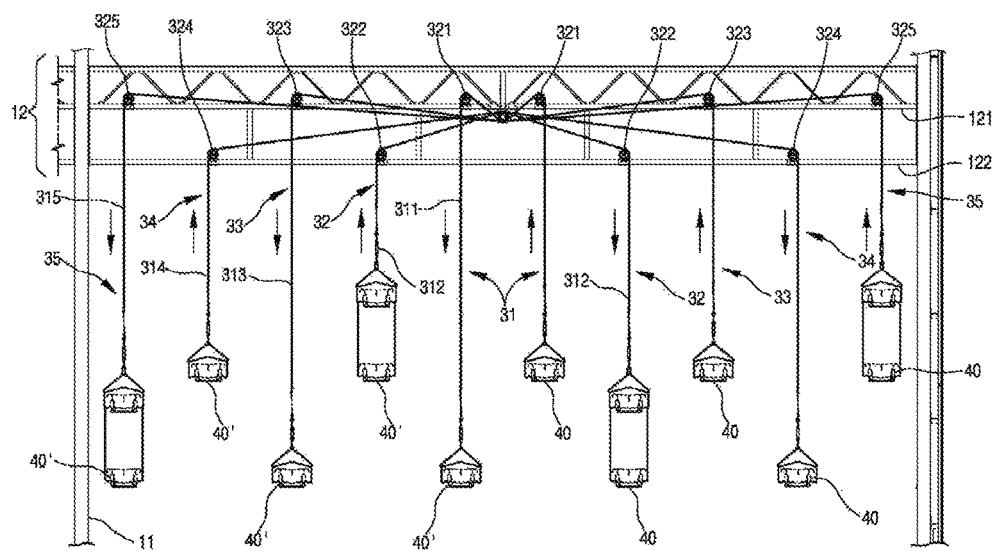

[FIG. 9]
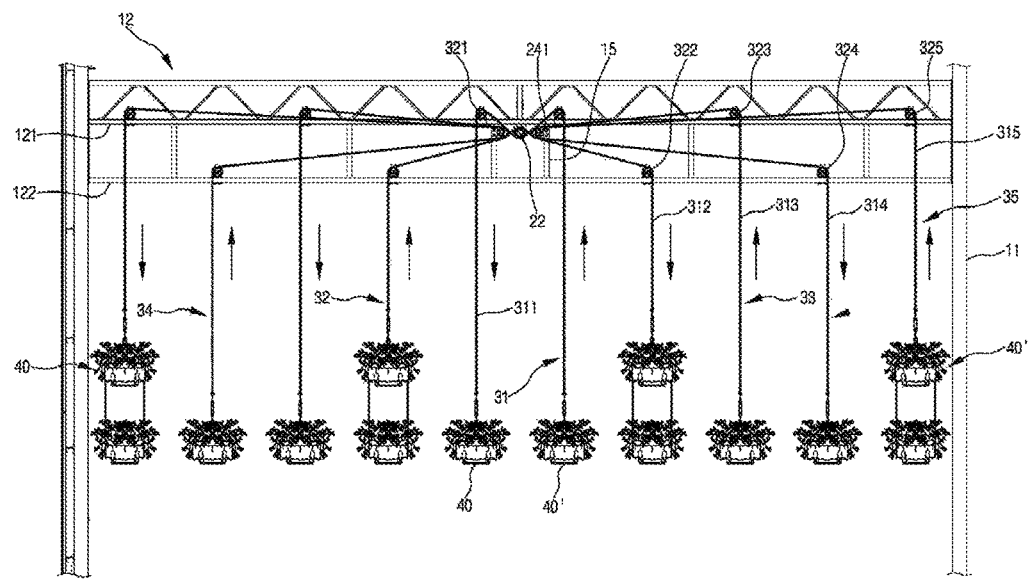

[FIG. 10]
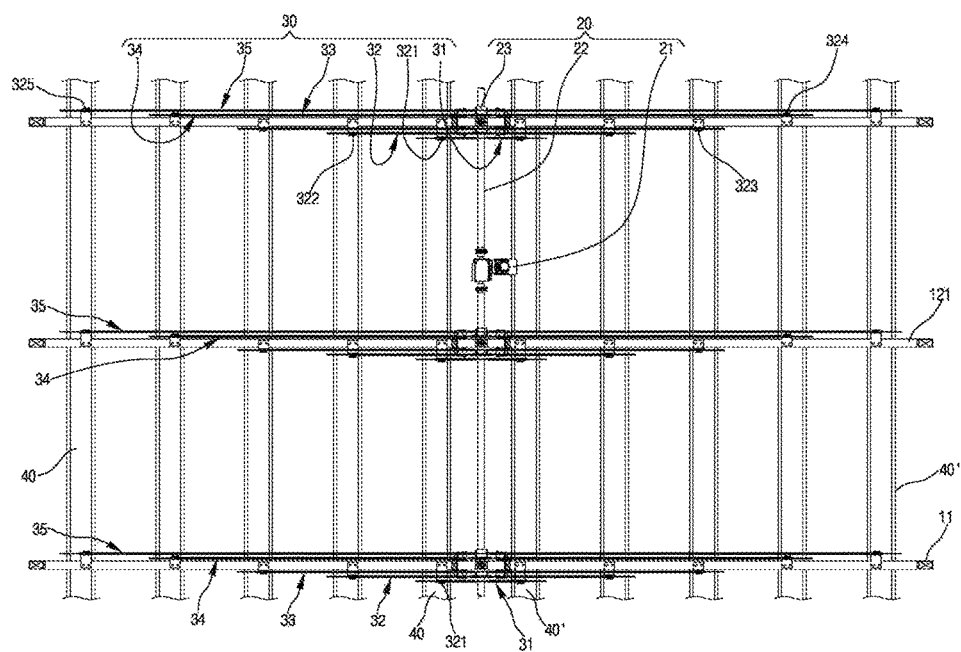

[FIG. 11]
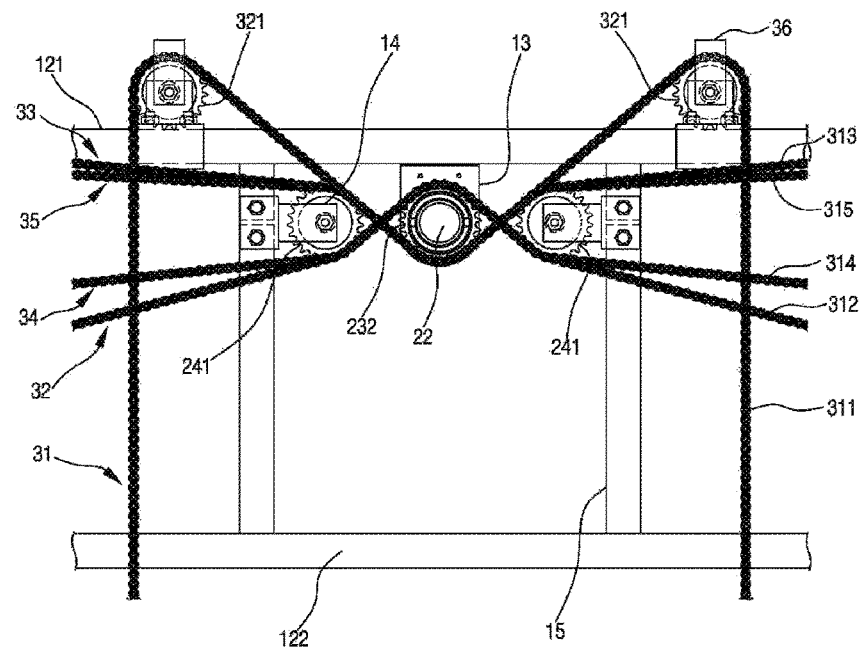
[FIG. 12A]
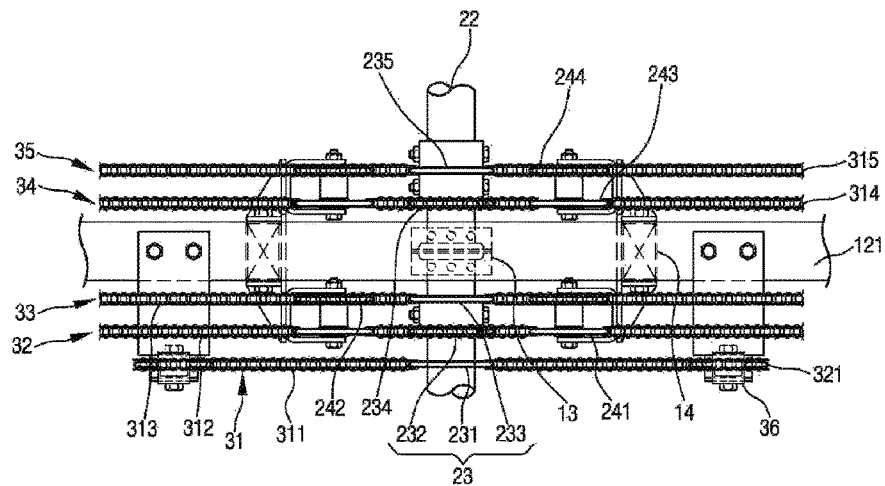

【FIG. 12B】
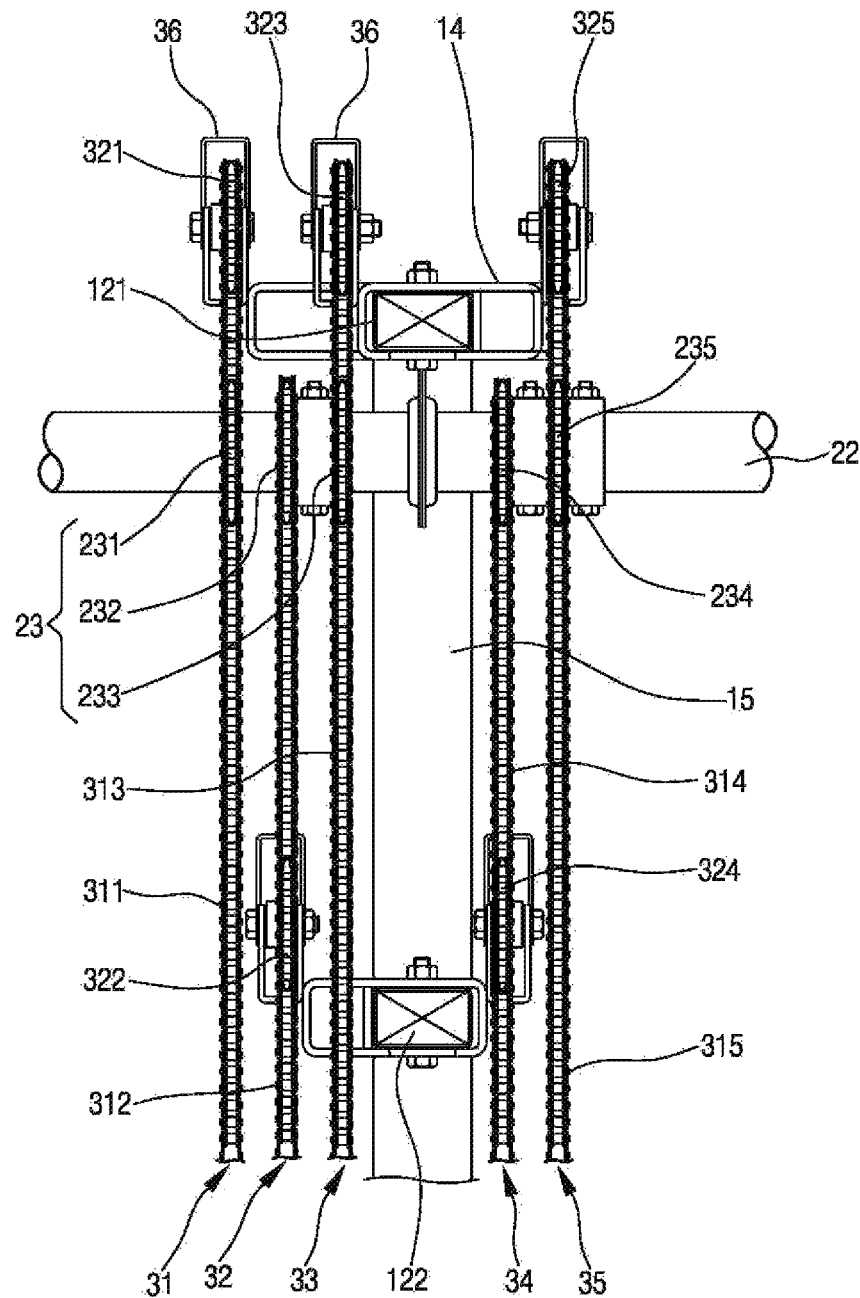

【FIG. 13A】
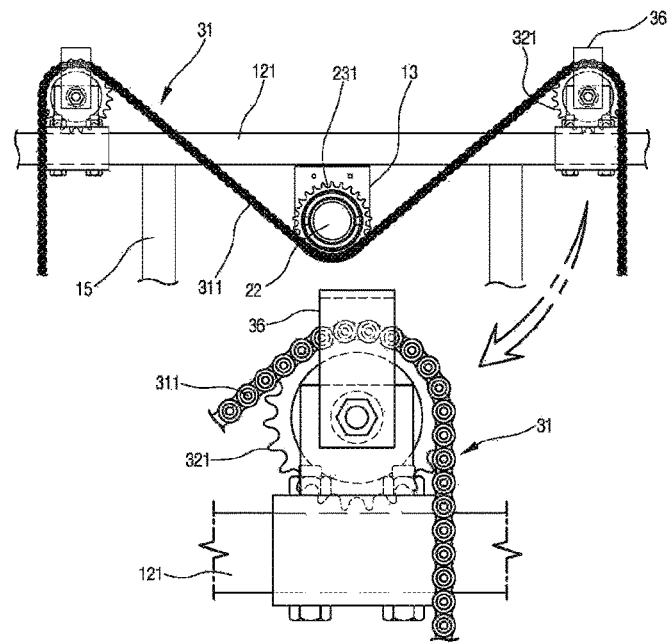
【FIG. 13B】
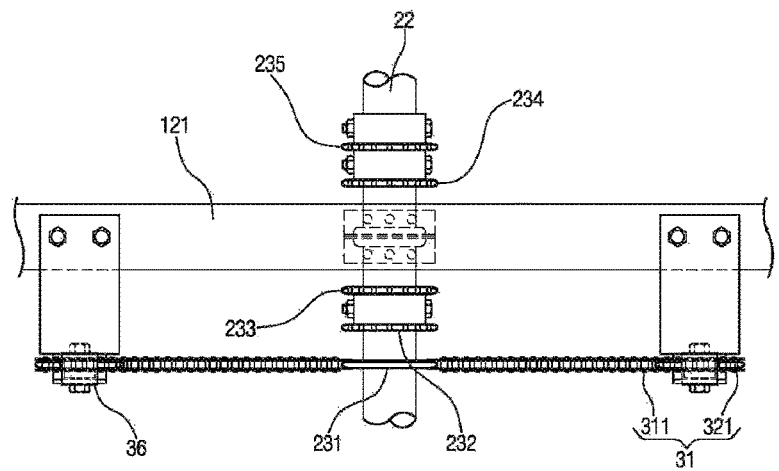

【FIG. 14A】
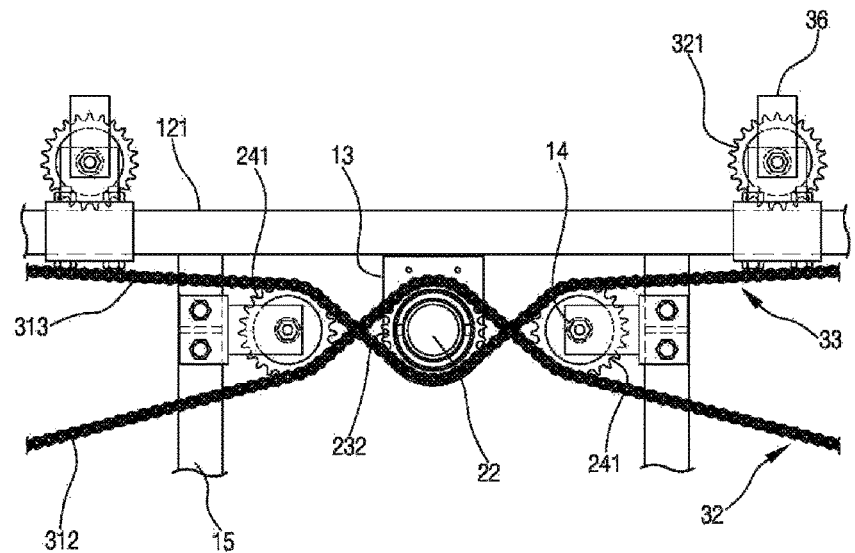
【FIG. 14B】
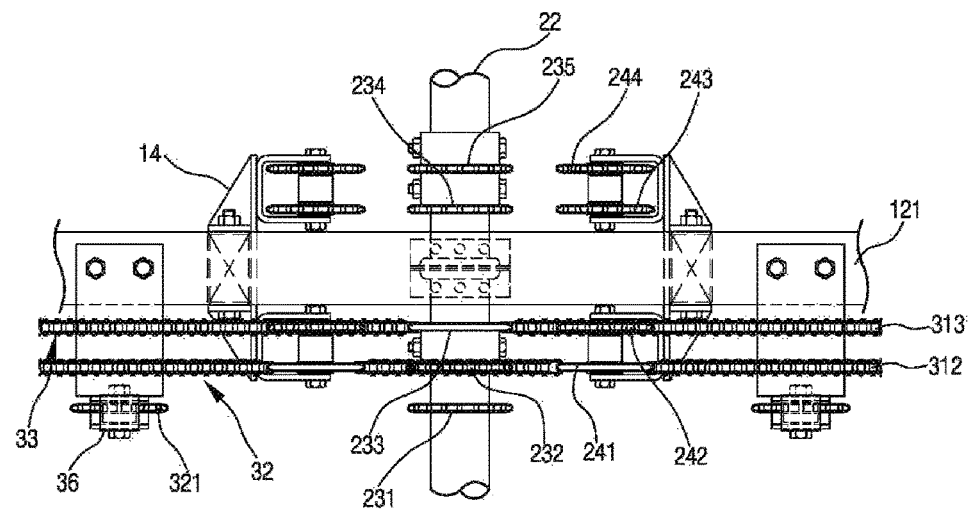

[FIG. 15A]
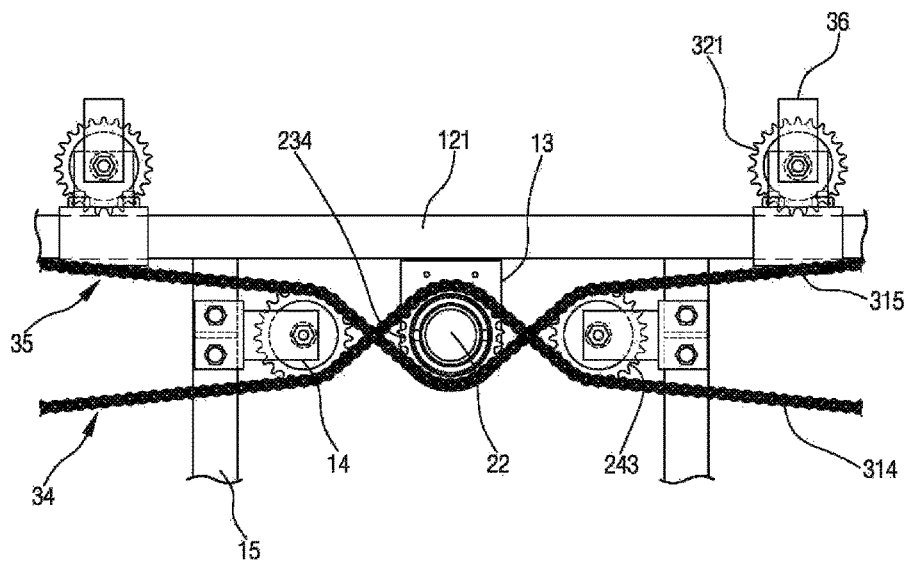
[FIG. 15B]
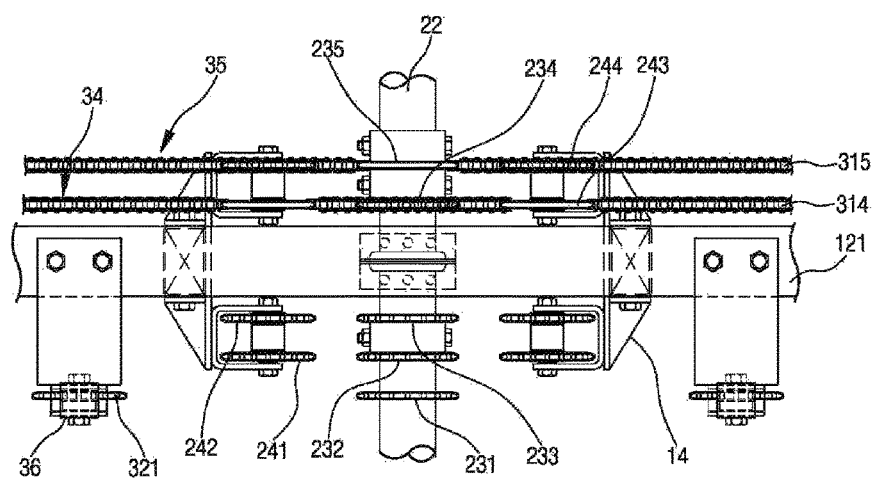

【FIG. 16A】
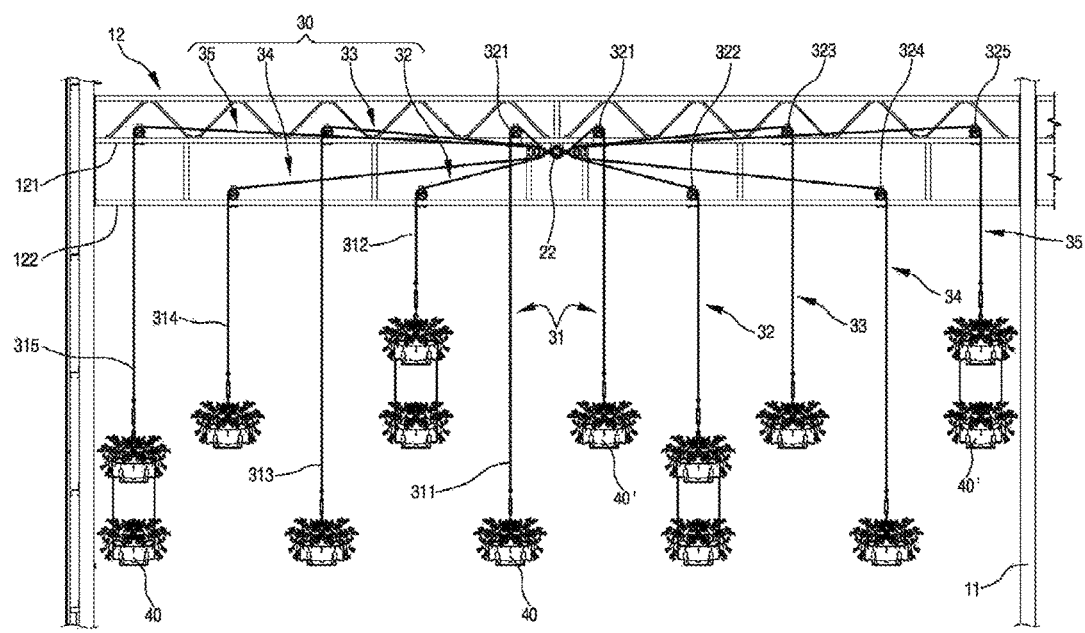

[FIG. 16B]
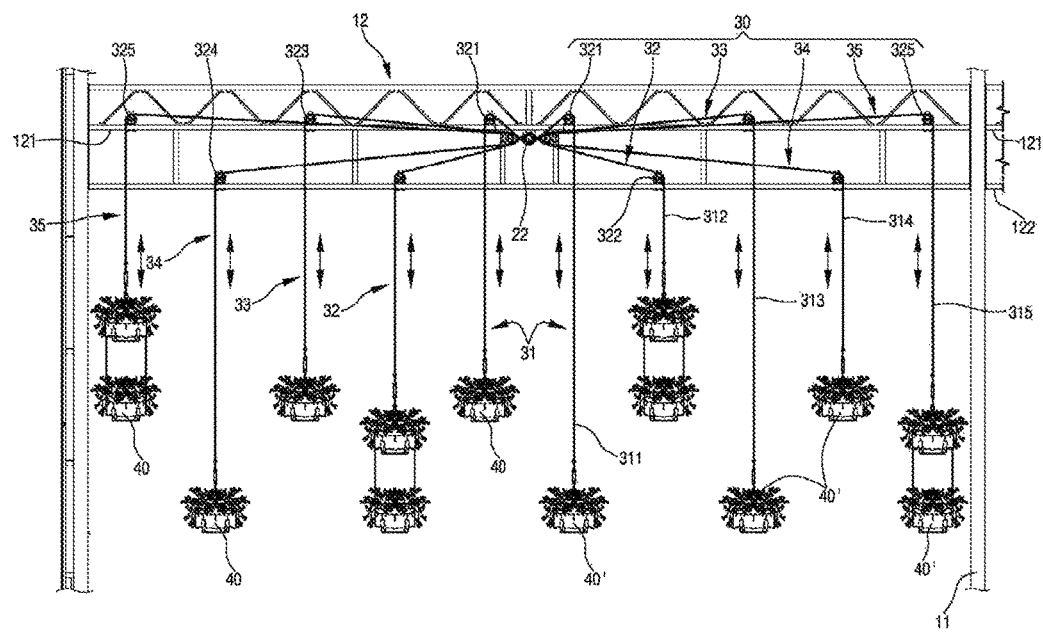

[FIG. 17]
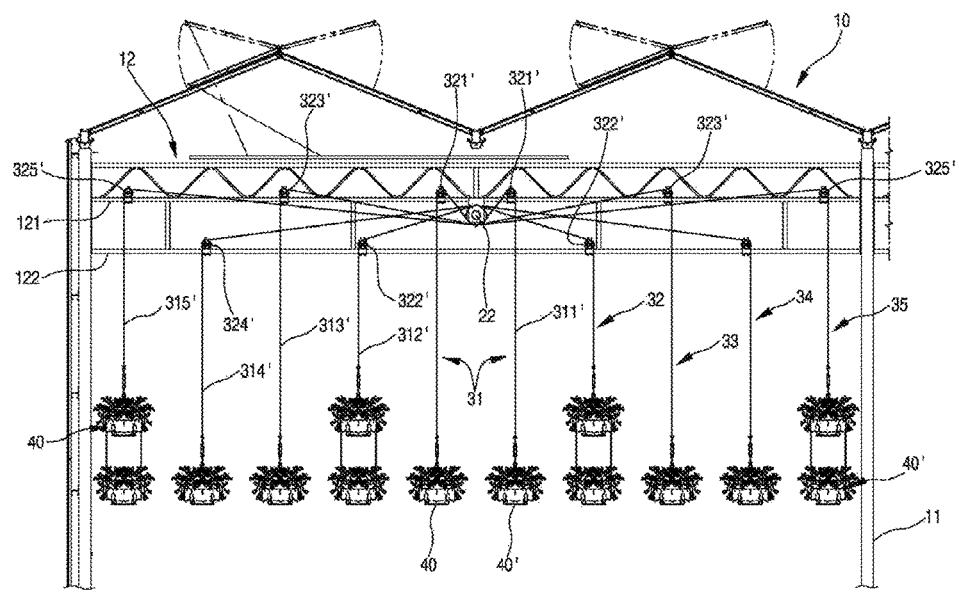

[FIG. 18]
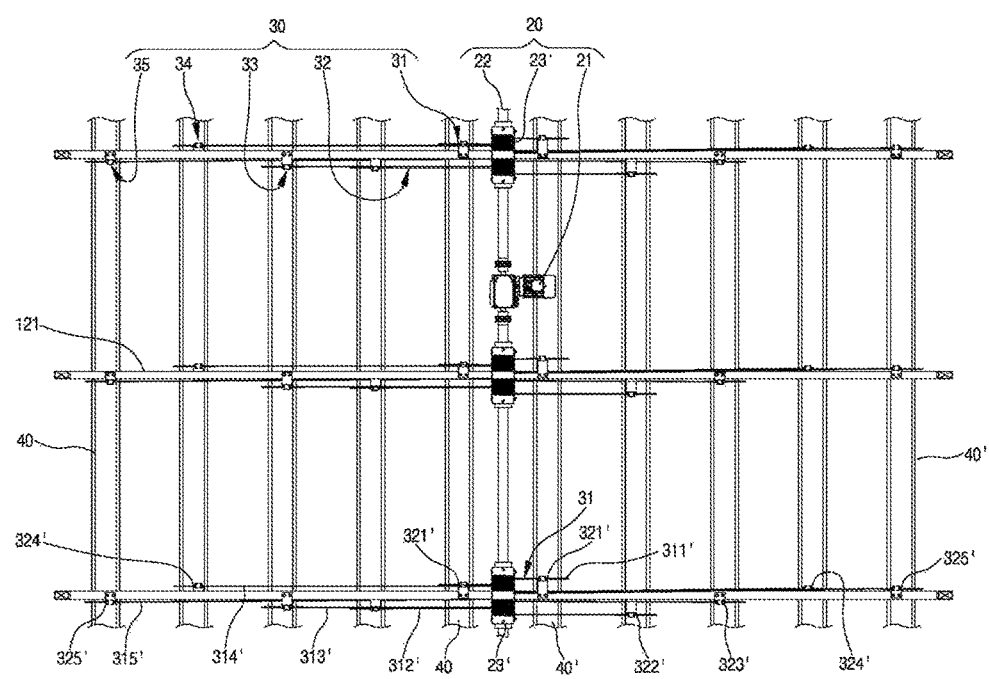

[FIG. 19]
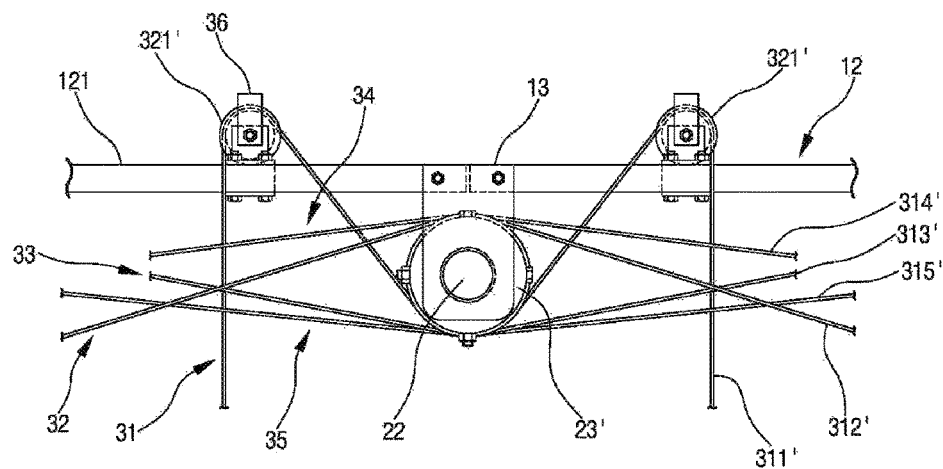
[FIG. 20A]
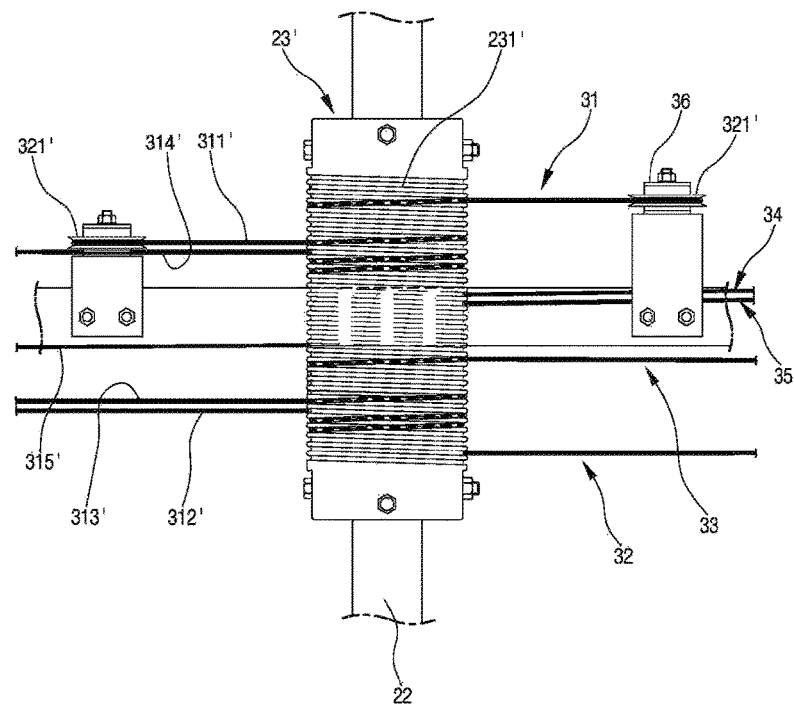

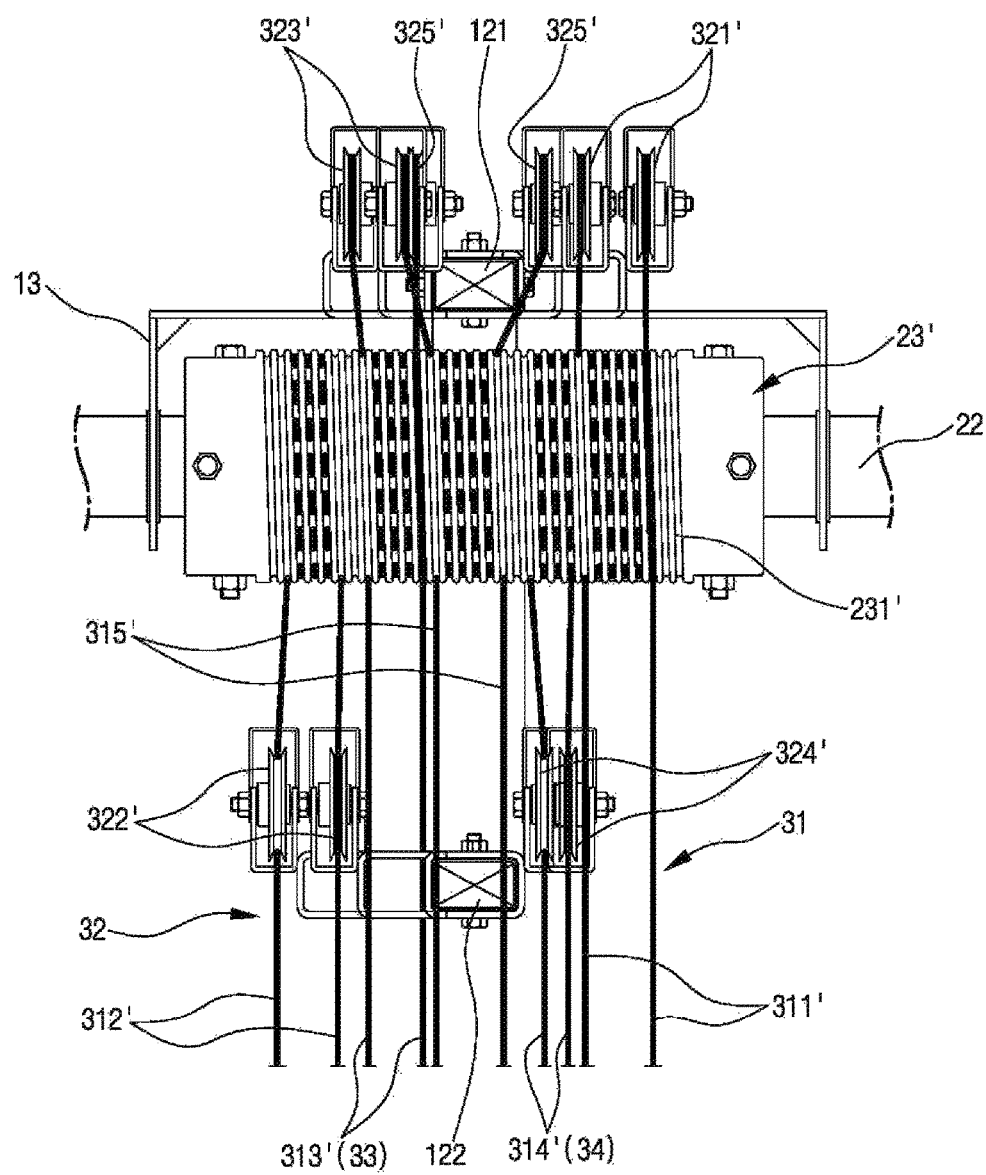
[FIG. 20B]

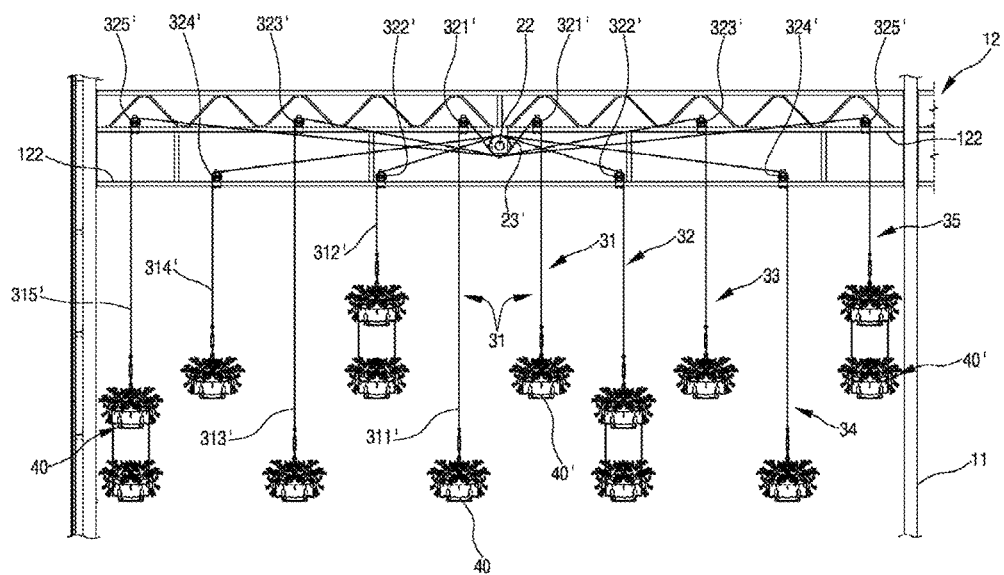
[FIG. 21]

PLANT CULTIVATION EQUIPMENT USING UP-DOWN SYSTEM

CROSS-REFERENCE TO RELATED APPLICATIONS

This application claims the priority of Korean Patent Applications No. 10-2017-0025429 filed on Feb. 27, 2017 and No. 10-2017-0036688 filed on Mar. 23, 2017, in the Korean Intellectual Property Office, the disclosure of which is incorporated herein by reference.

TECHNICAL FIELD

The present invention relates to a plant cultivation apparatus using an up-down system, and more particularly, to a plant cultivation apparatus using an up-down system enabling mass production of plants by allowing the entire area of a greenhouse to be used as a cultivation space.

BACKGROUND ART

In general, for cultivation with soil and hydroponics in a greenhouse, at least half of the area of the greenhouse is used for a passage of workers during seeding, cultivation work, or harvest. Thus, there was a problem that as the area for cultivation reduces in half, production volume reduces, for which not only production costs but also consumer prices increase, resulting in an increase in cost burden of both producers and customers.

In order to solve these problems, the present applicant has filed Korean Patent Application No. 2016-0069465 covering a plant cultivation apparatus including: a driving unit 20 installed at trusses 12 horizontally crossing top portions of a greenhouse 10 and including a motor 21, a drive shaft 22, a plurality of driven shafts 24, and a plurality of worm gear reducers 23, a plurality of elevating units 30 including a plurality of main sprockets 31 axially fixed respectively to the plurality of driven shafts at regular intervals in a forward and backward direction, a chain 32 having a main part interlocking with the center of the main sprocket, a left part 32a directed downward from a left side of the main sprocket, and a right part 32b directed downward from a right side of the main sprocket, left and right supports 33 and 33' whose top ends are vertically installed on the bottom of the truss to be spaced apart from the axially fixed position of the main sprocket at the same interval respectively, left and right guide sprockets 34 and 34' axially installed at lower portions of the supports to be located at lower left and right positions than the main sprocket on which the left and right parts are hung downward, and cultivation gutters 40 and 40' respectively ascending and descending in a state of being coupled to the left and right parts of the chain, as illustrated in FIGS. 1 to 3. Normally, a plurality of cultivation gutters is hung on the same horizontal line at the same height from the ground at regular intervals. When a passage of workers is required during seeding, cultivation work, or harvest, the plurality of elevating units raise and lower the left and right cultivation gutters alternately one by one by the operation of the driving unit to form a passage of workers between the raised cultivation gutters. Thus, the entire area of the greenhouse may be used as a cultivation area, so that the productivity may be double.

However, in order to raise and lower the left and right cultivation gutters 40 and 40' alternately one by one by operating the plurality of elevating units 30 using one driving unit 20, the plant cultivation apparatus of the conventional earlier application includes the driving shat 22 rotatably installed by the motor 21, the plurality of driven shafts 24 installed perpendicular to the drive shaft, and the plurality of worn gear reducers 23 respectively installed at intersections of the drive shaft and the driven shafts and configured to simultaneously rotate the driven shafts by transferring a decelerated rotational force of the drive shaft thereto. Since the structure of operating a plurality of elevating members by transferring a driving force of the motor is complicated, a large number of parts are required, and installation time increases, installation and maintenance are very difficult and troublesome. Also, the cost burden of producers and customers cannot be reduced since there is a limit to lowering production costs because of rising costs for installation and maintenance and repair.

DETAILED DESCRIPTION OF THE INVENTION

Technical Problem

Accordingly, the present invention is made in an effort to resolve the problems of the conventional art. It is an object of the present invention to provide a plant cultivation apparatus using an up-down system which enables installation and maintenance to be very simple and easy, while greatly reducing the cost burden of producers and consumers.

Technical Solution

In order to achieve the above objects, the present invention provides a plant cultivation apparatus using an up-down system including: a driving unit including a deceleration motor, a drive shaft axially installed on the bottoms of middle crossbars of trusses of a greenhouse to cross the middle crossbars in a forward and backward direction and rotating by the deceleration motor, driving sprocket members configured with a set of five sprockets of first to fifth sprockets and axially installed at regular intervals in the forward and backward direction, and first to fourth left and right auxiliary sprockets installed to be adjacent to left and right sides of the second to fifth sprockets respectively; and an elevating unit configured with a set of five elevating members of first to fifth elevating members, wherein the first elevating member includes first left and right guide sprockets installed on the top of the middle crossbar of the truss to be located at upper positions than the drive shaft and spaced apart from left and right sides of the drive shaft at the same interval respectively and a first elevating chain having a middle part interlocking with a bottom portion of the first sprocket, left and right parts interlocking with top portions of the first left and right guide sprockets and directed downward from left and right sides of the top portions thereof respectively, and left and right ends to which cultivation gutters are coupled respectively, the second elevating member includes second left and right guide sprockets installed on the top of a lower crossbar of the truss to be located at lower positions than the first left and right guide sprockets and spaced apart from left and right sides thereof at the same interval respectively and a second elevating chain having a middle part interlocking with a top portion of the second sprocket, left and right parts interlocking with bottom portions of the first left and right auxiliary sprockets and top portions of the second left and right guide sprockets and directed downward from left and right sides of the top portions of the second left and right guide sprockets respectively, and left and right ends to which cultivation gutters are coupled respectively, the third elevating member includes third left and right guide sprockets installed on the top of the middle crossbar to be located at upper positions than the second left and right guide sprockets and spaced apart from left and right sides thereof at the same interval respectively and a third elevating chain having a middle part interlocking with a bottom portion of the third sprocket, left and right parts interlocking with top portions of the second left and right auxiliary sprockets and top portions of the third left and right guide sprockets and directed downward from left and right sides of the top portions of the third left and right guide sprockets respectively, and left and right ends to which cultivation gutters are coupled respectively, the fourth elevating member includes fourth left and right guide sprockets installed on the top of the lower crossbar to be located at lower positions than the third left and right guide sprockets and spaced apart from left and right sides thereof at the same interval respectively and a fourth elevating chain having a middle part interlocking with a top portion of the fourth sprocket, left and right parts interlocking with bottom portions of the third left and right auxiliary sprockets and top portions of the fourth left and right guide sprockets and directed downward from left and right sides of the top portions of the fourth left and right guide sprockets respectively, and left and right ends to which cultivation gutters are coupled respectively, and the fifth elevating member includes fifth left and right guide sprockets installed on the top of the middle crossbar to be located at upper positions than the fourth left and right guide sprockets and spaced apart from left and right sides thereof at the same interval respectively and a fifth elevating chain having a middle part interlocking with a bottom portion of the fifth sprocket, left and right parts interlocking with top portions of the fourth left and right auxiliary sprockets and top portions of the fifth left and right guide sprockets and directed downward from left and right sides of the top portions of the fifth left and right guide sprockets respectively, and left and right ends to which cultivation gutters are coupled respectively, wherein a plurality of cultivation gutters is hung on the same horizontal line at the same height from the ground at regular intervals normally and when a passage of workers is required during seeding, cultivation work, or harvest, the elevating unit raises and lower the cultivation gutters alternately one by one by the operation of the driving unit to form a passage of workers between the raised cultivation gutters, and thus the productivity is doubled since the entire area of the greenhouse is used for cultivation.

The present invention also provides a plant cultivation apparatus using an up-down system including: a driving unit including a deceleration motor, a drive shaft axially installed on the bottoms of middle crossbars of trusses of a greenhouse to cross the middle crossbars in a forward and backward direction and rotating by the deceleration motor, and reel members axially installed at the driving shaft at regular intervals in the forward and backward direction; and an elevating unit configured with a set of five elevating members of first to fifth elevating members, wherein the first elevating member includes first left and right guide pulleys installed on the top of the middle crossbar of the truss at rear left and right portions thereof to be located at upper positions than the drive shaft and spaced apart from left and right sides of the drive shaft at the same interval respectively and a first elevating wire having a middle part spirally wound several times around a rear end portion of the winding groove, a left part directed upward from a front lower portion of the left side, hung on a top portion of the first left guide pulley located at a front position between the first left and right guide pulleys, and directed downward from a left side of the top portion thereof, and a right part directed upward from a rear lower portion of the right side, hung on a top portion of the first right guide pulley located at a rear position, and directed downward from a right side of the top portion thereof, the second elevating member includes second left and right guide pulleys installed on the top of a lower crossbar of the truss at front left and right positions thereof to be located at lower positions than the first left and right guide pulleys and spaced apart from left and right sides thereof at the same interval respectively and a second elevating wire having a middle part spirally wound several times around a front end portion of the winding groove, a left part directed downward from a rear upper portion of the left side, hung on a top portion of the second left guide pulley located at a rear position between the second left and right guide pulleys, and directed downward from a left side of the top portion thereof, and a right part directed downward from a rear upper portion of the right side, hung on a top portion of the second right guide pulley, and directed downward from a right side of the top portion thereof, the third elevating member includes third left and right guide pulleys installed on the top of the middle crossbar at front left and right portions thereof to be located at upper positions than the second left and right guide pulleys and spaced apart from left and right sides thereof at the same interval respectively and a third elevating wire having a middle part spirally wound several times around the winding groove to be isolated from the rear portion of the middle part of the second elevating wire, a left part directed upward from a front lower portion of the left side, hung on a top portion of the third left guide pulley located at a front position between the third left and right guide pulleys, and directed downward from a left side of the top portion thereof, and a right part directed upward from a rear lower portion of the right side, hung on a top portion of the third right guide pulley located at a rear position, and directed downward from a right side of the top portion thereof, the fourth elevating member includes fourth left and right guide pulleys installed on the top of a lower crossbar at rear left and right positions thereof to be located at lower positions than the third left and right guide pulleys and spaced apart from left and right sides thereof at the same interval respectively and a fourth elevating wire having a middle part spirally wound several times around the winding groove to be isolated from the front portion of the middle part of the first elevating wire, a left part directed downward from a rear upper portion of the left side, hung on a top portion of the fourth left guide pulley located at a rear position between the fourth left and right guide pulleys, and directed downward from a left side of the top portion thereof, and a right part directed downward from a rear upper portion of the right side, hung on a top portion of the fourth right guide pulley located at a front position, and directed downward from a right side of the top portion thereof, and the fifth elevating member includes fifth left and right guide pulleys installed on the top of the middle crossbar at front and rear portions thereof to be located at upper positions than the fourth left and right guide pulleys and spaced apart from left and right sides thereof at the same interval respectively and a fifth elevating wire having a middle part spirally wound several times around the winding groove in a state where the front portion of the middle part is isolated from the rear portion of the middle part of the third elevating wire and the rear portion of the middle part is isolated from the front portion of the fourth elevating wire, a left part directed upward from a front lower portion of the left side, hung on a top portion of the fifth left guide pulley located at a front position between the fifth left and right guide pulleys, and directed downward from a left side of the top portion thereof, and a right part directed upward from a rear lower portion of the right side, hung on a top portion of the fifth right guide pulley located at a rear position, and directed downward from a right side of the top portion thereof, wherein a plurality of cultivation gutters is hung on the same horizontal line at the same height from the ground at regular intervals normally and when a passage of workers is required during seeding, cultivation work, or harvest, the elevating unit raises and lower the cultivation gutters alternately one by one by the operation of the driving unit to form a passage of workers between the raised cultivation gutters, and thus the productivity is doubled since the entire area of the greenhouse is used for cultivation.

Advantageous Effects

The plant cultivation apparatus using an up-down system according to the present invention is configured to simultaneously and directly transfer a driving force of one deceleration motor to a plurality of elevating members via one drive shaft. Thus, there is an advantage that the structure is simplified and installation and maintenance are very simple and easy. In addition, the cost burden of producers and consumers may be reduced by inhibiting an increase in production costs due to a considerable reduction in related costs.

BRIEF DESCRIPTION OF DRAWINGS

FIG. 1 is a schematic front view illustrating a portion of a greenhouse in which a plant cultivation apparatus of the conventional earlier application is installed.

FIG. 2 is a schematic plan view illustrating the plant cultivation apparatus of FIG. 1.

FIG. 3 is a front view illustrating a partially extracted and enlarged state of one elevating unit of FIG. 1.

FIG. 4 is a schematic front view illustrating a portion of a greenhouse in which a plant cultivation apparatus using an up-down system according to a first exemplary embodiment of the present invention is installed.

FIG. 5 is a plan view illustrating the plant cultivation apparatus using the up-down system in which a portion of FIG. 4 is omitted.

FIG. 6 is a front view illustrating an extracted and enlarged state of a portion in FIG. 4.

FIGS. 7A and 7B are enlarged plan and side views of FIG. 6.

FIG. 8 is a front view illustrating cultivation gutters of FIG. 4 whose heights are adjusted.

FIG. 9 is a schematic front view illustrating a portion of a greenhouse in which a plant cultivation apparatus using an up-down system according to a second exemplary embodiment is installed.

FIG. 10 is a plan view illustrating the plant cultivation apparatus using the up-down system of FIG. 9 from which some elements are omitted.

FIG. 11 is a front view illustrating an extracted and enlarged state of a portion in FIG. 9.

FIGS. 12A and 12B are enlarged plan and side views of FIG. 11.

FIGS. 13A and 13B are front and plan views illustrating a partially extracted and enlarged state of a first elevating member in FIG. 11.

FIGS. 14A and 14B are front and plan views illustrating a partially extracted and enlarged state of second and third elevating members in FIG. 11.

FIGS. 15A and 15B are font and plan views illustrating a partially extracted and enlarged state of fourth and fifth elevating members in FIG. 11.

FIGS. 16A and 16B are front views illustrating a state where heights of cultivation gutters in FIG. 9 are differently adjusted.

FIG. 17 is a schematic front view illustrating a portion of a greenhouse in which a plant cultivation apparatus using an up-down system according to a third exemplary embodiment is installed.

FIG. 18 is a plan view illustrating the plant cultivation apparatus using the up-down system of FIG. 17 from which some elements are omitted.

FIG. 19 is a front view illustrating an enlarged portion of FIG. 17.

FIGS. 20A and 20B are enlarged plan and side views of FIG. 19.

FIG. 21 is a front view illustrating a state where heights of cultivation gutters in FIG. 17 are adjusted.

DETAILED DESCRIPTION OF THE EMBODIMENTS

Hereinafter, a plant cultivation apparatus using an up-down system according to embodiments of the present invention will be described in more detail with reference to the accompanying drawings.

FIG. 4 is a schematic front view illustrating a portion of a greenhouse in which a plant cultivation apparatus using an up-down system according to a first exemplary embodiment of the present invention is installed. FIG. 5 is a plan view illustrating the plant cultivation apparatus using the up-down system in which a portion of FIG. 4 is omitted.

The plant cultivation apparatus using the up-down system according to the first exemplary embodiment of the present invention illustrated in FIGS. 4 and 5 includes a driving unit 20 installed at trusses 12 installed at regular intervals in a forward and backward direction to horizontally cross tops of pillars 11 of a greenhouse 10 having a general roof structure widely used in the art, an elevating unit 30 installed to ascend and descend by the driving unit, and cultivation gutters 40 and 40' respectively hanging from left and right parts of the elevating unit 30.

FIG. 6 is a front view illustrating an extracted and enlarged state of a portion in FIG. 4. FIGS. 7A and 7B are enlarged plan and side views of FIG. 6. FIG. 8 is a front view illustrating cultivation gutters of FIG. 4 whose heights are adjusted.

The driving unit 20 may include a deceleration motor 21, a drive shaft 22 installed on the bottoms of middle crossbars 121 of the trusses 12 with a bearing to cross the middle crossbars 121 in the forward and backward direction and rotating forward and backward by the deceleration motor, and driving sprocket members 23 axially installed at the drive shaft at regular intervals in the forward and backward direction.

The driving sprocket member 23 is configured with a set of five sprockets of first to fifth sprockets 231 to 235. The first to fifth sprockets may be formed separately or groups of two or three sprockets may be axially fixed to portions corresponding to the drive shaft 22.

When the first to fifth sprockets 231 to 235 are axially fixed to the drive shaft 22, the predetermined positions of the drive shaft crossing the middle crossbars 121 may be distributed in front of and behind the bearing 13 axially installed at the middle crossbar.

In this way, loads of the cultivation gutters 40 and 40' respectively coupled to the first to fifth sprockets 231 to 235 are not concentrated on the drive shaft 22 but distributed by the bearing 13, which will be described later, and thus shaft deformation or the like does not occur even after long-term use.

The elevating unit 30 includes first to fifth elevating members 31 to 35.

The first to fifth elevating members 31 to 35 include first to fifth elevating chains 311 to 315 having middle parts interlocking with top or bottom portions of the first to fifth sprockets 231 to 235 and left and right ends to which cultivation gutters 40 and 40' are coupled respectively and first to fifth left and right guide sprockets 321 to 325 on which left and right parts of the first to fifth elevating chains are hung downward respectively.

The first left and right guide sprockets 321 of the first elevating member 31 are installed on the top of the middle crossbar 121 to be located at upper positions than the drive shaft 22 and spaced apart from left and right sides of the drive shaft 22 at the same interval, and the first elevating chain 311 is installed such that the middle part thereof interlocks with the bottom portion of the first sprocket 231 and the left and right parts thereof interlock with the top portions of the first left and right guide sprockets and are directed downward from left and right sides of the top portions respectively.

In this way, when the deceleration motor 21 is driven forward and the first sprocket 231 rotates clockwise by the drive shaft 22, the middle part of the first elevating chain 311 moves to the left so that the right part ascends and the left part descends in accordance with guidance of the first left and right guide sprockets 321, and thus the left cultivation gutter 40 descends and the right cultivation gutter 40' ascends. On the contrary, when the deceleration motor is driven backward and the first sprocket rotates counterclockwise, the middle part of the first elevating chain moves to the right so that the right cultivation gutter descends and the left cultivation gutter ascends.

The second left and right guide sprockets 322 of the second elevating member 32 are installed on the top of a lower crossbar 122 to be located at lower positions than the first left and right guide sprockets 321 and spaced apart from left and right sides of the first left and right guide sprockets 321 at the same internal respectively, and the second elevating chain 312 is installed such that the middle part interlocks with the top portion of the second sprocket 232 and the left and right parts interlock with the top portions of the second left and right guide sprockets and are directed from left and right sides of the top portions respectively.

In this way, when the deceleration motor 21 is driven forward and the second sprocket 232 rotates clockwise by the drive shaft 22, the middle part of the second elevating chain 312 moves to the right so that the left part ascends and the right pail descends in accordance with guidance of the second left and right guide sprockets 322, and thus the left cultivation gutter 40 ascends and the right cultivation gutter 40' descends. On the contrary, when the deceleration motor is driven backward and the second sprocket rotates counterclockwise, the middle part of the second elevating chain moves to the left so that the right cultivation gutter ascends and the left cultivation gutter descends.

The third left and right guide sprockets 323 of the third elevating member 33 are installed on the top of the middle crossbar 121 to be located at upper positions than the second left and right guide sprockets 322 and spaced apart from left and right sides of the second left and right guide sprockets 322 at the same internal respectively, and the third elevating chain 313 is installed such that the middle part interlocks with the bottom portion of the third sprocket 233 and the left and right parts interlock with the top portions of the third left and right guide sprockets and are directed downward from left and right sides of the top portions respectively.

In this way, when the deceleration motor 21 is driven forward and the third sprocket 233 rotates clockwise by the drive shaft 22, the middle part of the third elevating chain 313 moves to the left so that the left pa L descends and the right part ascends in accordance with guidance of the third left and right guide sprockets 323, and thus the left cultivation gutter 40 descends and the right cultivation gutter 40' ascends. On the contrary, when the deceleration motor is driven backward and the third sprocket rotates counterclockwise, the middle part of the third elevating chain moves to the right so that the right cultivation gutter descends and the left cultivation gutter ascends.

The fourth left and right guide sprockets 324 of the fourth elevating member 34 are installed on the top of the lower crossbar 122 to be located at lower positions than the third left and right guide sprockets 323 and spaced apart from left and right sides of the third left and right guide sprockets 323 at the same internal respectively, and the fourth elevating chain 314 is installed such that the middle part interlocks with the top portion of the fourth sprocket 234 and the left and right parts interlock with the top portions of the fourth left and right guide sprockets and are directed from left and right sides of the top portions respectively.

In this way, when the deceleration motor 21 is driven forward and the fourth sprocket 234 rotates clockwise by the drive shaft 22, the middle part of the fourth elevating chain 314 moves to the right so that the left part ascends and the right pa L descends in accordance with guidance of the fourth left and right guide sprockets 324, and thus the left cultivation gutter 40 ascends and the right cultivation gutter 40' descends. On the contrary, when the deceleration motor is driven backward and the fourth sprocket rotates counterclockwise, the middle part of the fourth elevating chain moves to the left so that the right cultivation gutter ascends and the left cultivation gutter descends.

The fifth left and right guide sprockets 325 of the fifth elevating member 35 are installed on the top of the middle crossbar 121 to be located at upper positions than the fourth left and right guide sprockets 324 and spaced apart from left and right sides of the fourth left and right guide sprockets 324 at the same internal respectively, and the fifth elevating chain 315 is installed such that the middle part interlocks with the bottom portion of the fifth sprocket 235 and the left and right parts interlock with the top portions of the fifth left and right guide sprockets and are directed downward from left and right sides of the top portions respectively.

In this way, when the deceleration motor 21 is driven forward and the fifth sprocket 235 rotates clockwise by the drive shaft 22, the middle part of the fifth elevating chain 315 moves to the left so that the left part descends and the right part ascends in accordance with guidance of the fifth left and right guide sprockets 325, and thus the left cultivation gutter 40 descends and the right cultivation gutter 40' ascends. On the contrary, when the deceleration motor is driven backward and the fifth sprocket rotates counterclockwise, the middle part of the fifth elevating chain moves to the right so that the right cultivation gutter descends and the left cultivation gutter ascends.

When the first to fifth elevating members 31 to 35 are installed as described above, the left and right cultivation gutters 40 and 40' of the first to fifth elevating members may ascend and descend alternately in turn in a zigzag shape with the aid of only one deceleration motor 21 and one drive shaft 22.

That is, when the first to fifth sprockets 231 to 235 simultaneously rotate clockwise by the drive shaft 22 in response to the forward driving of the deceleration motor 21 in a state where the left and right cultivation gutters 40 and 40' of the first to fifth elevating members 31 to 35 are positioned on the same horizontal line at the same height as illustrated in FIG. 4, the middle parts of the first, third, and fifth elevating chains 311, 313, and 315 move to the left simultaneously while the second and fourth elevating chains 312 and 314 move to the right simultaneously.

In this case, the left cultivation gutters 40 respectively coupled to the left ends of the first, third, and fifth elevating chains 311, 313, and 315 descend simultaneously and the right cultivation gutters 40' respectively coupled to the right ends thereof ascend simultaneously, while the left cultivation gutters 40 respectively coupled to the left ends of the second and fourth elevating chains 312 and 314 ascend simultaneously and the right cultivation gutters 40' respectively coupled to the right ends thereof descend simultaneously. Thus, the left and right cultivation gutters ascend and descend alternately in turn in the zigzag shape by using only one deceleration motor 21 and one drive shaft 22 to form a passage for workers as illustrated in FIG. 5.

Meanwhile, although it has been described that the elevating unit 30 is configured with a set of five elevating members, i.e., first to fifth elevating members 31 to 35 according to the first exemplary embodiment, the present embodiment is not limited thereto. The elevating units each configured with a set of three, four, or more elevating members may also be continuously aligned horizontally or vertically in accordance of widthwise and lengthwise areas of the inside of the greenhouse 10 in which the elevating units will be installed. It is obvious that such modifications are included within the scope of the invention.

Also, the first to fifth left and right guide sprockets 321 to 325 may be axially installed inside anti-dislocation brackets 36 having open left and right sides and configured to prevent each of the first to fifth elevating chains 311 to 315 interlocking with the first to fifth left and right guide sprockets from being dislocated from moving paths thereof.

FIG. 9 is a schematic front view illustrating a portion of a greenhouse in which a plant cultivation apparatus using an up-down system according to a second exemplary embodiment is installed. FIG. 10 is a plan view illustrating the plant cultivation apparatus using the up-down system of FIG. 9 from which some elements are omitted. FIG. 11 is a front view illustrating an extracted and enlarged state of a portion in FIG. 9. FIGS. 12A and 12B are enlarged plan and side views of FIG. 11.

The plant cultivation apparatus using the up-down system according to the second exemplary embodiment illustrated in FIGS. 9 to 12B has the same configuration as that according to the first exemplary embodiment which includes a driving unit 20 installed at trusses 12 installed at regular intervals in a forward and backward direction to horizontally cross tops of pillars 11 of a greenhouse 10, and including a deceleration motor 21, a drive shaft 22 installed on the bottoms of middle crossbars 121 of the trusses 12 with a bearing to cross the middle crossbars 121 in the forward and backward direction and rotates forward and backward by the deceleration motor, and driving sprocket members 23 each configured with a set of five members of the first to fifth sprockets 231 to 235 and axially installed at the drive shaft at regular intervals in the forward and backward direction, and an elevating unit 30 including first to fifth elevating members 31 to 35 which include first to fifth elevating chains 311 to 315 having middle parts interlocking with the first to fifth sprockets 231 to 235 and left and right ends to which cultivation gutters 40 and 40' are coupled respectively, and first to fifth left and right guide sprockets 321 to 325 distributedly installed on the middle crossbar 121 and a lower crossbar 122 of the truss such that left and right parts of the first to fifth elevating chains are hung on the first to fifth left and right guide sprockets respectively. The second exemplary embodiment is distinguished from the first exemplary embodiment in that the driving unit further includes first to fourth left and right auxiliary sprockets 241 to 244 respectively installed to be adjacent to left and right sides of the second to fifth sprockets.

The driving sprocket member 23 according to the second exemplary embodiment has the same configuration as that according to the first exemplary embodiment in that the first to fifth sprockets 231 to 235 are formed separately or groups of two or three sprockets are axially fixed with the bearing 13 to portions corresponding to the drive shaft crossing the middle crossbars 121 to be located in front of and behind the middle crossbar.

Meanwhile, among the first to fifth sprockets 231 to 235, the first to third sprockets 231 to 233 are installed at front portions of the drive shaft 22 to be spaced apart from each other in the forward and backward direction in front of the middle crossbar 121, and the fourth and fifth sprockets 234 and 235 are installed at rear portions of the drive shaft spaced apart from each other in the forward and backward direction behind the middle crossbar.

Also, the first and second left and right auxiliary sprockets 241 and 242 are axially installed at left and right sides of the second and third sprockets 232 and 233 and the third and fourth left and right auxiliary sprockets 243 and 244 are axially installed at left and right sides of the fourth and fifth sprockets 234 and 235 respectively in front of or behind the left and right bearing brackets 14 to be located on the same line and spaced apart from each other at the same interval.

The first to fifth elevating members 31 to 35 include the first to fifth elevating chains 311 to 315 having middle parts interlocking with top or bottom portions of the first to fifth sprockets 231 to 235 and left and right ends to which cultivation gutters 40 and 40' are coupled respectively, and the first to fifth left and right guide sprockets 321 to 325 on which left and right parts of the first to fifth elevating chains are hung downward respectively.

The first left and right guide sprockets 321 are installed on the top of the middle crossbar 121 to be located at upper positions than the drive shaft 22 and spaced apart from left and right sides of the drive shaft 22 at the same interval respectively. The second left and right guide sprockets 322 are installed on the top of a lower crossbar 122 to be located at lower positions than the first left and right guide sprockets 321 and spaced apart from left and right sides of the first left and right guide sprockets 321 at the same internal respectively. The third left and right guide sprockets 323 are installed on the top of the middle crossbar 121 to be located at upper positions than the second left and right guide sprockets 322 and spaced apart from left and right sides of the second left and right guide sprockets 322 at the same internal respectively. The fourth left and right guide sprockets 324 are installed on the top of the lower crossbar 122 to be located at lower positions than the third left and right guide sprockets 323 and spaced apart from left and right sides of the third left and right guide sprockets 323 at the same internal respectively. The fifth left and right guide sprockets 325 are installed on the top of the middle crossbar 121 to be located at upper positions than the fourth left and right guide sprockets 324 and spaced apart from left and right sides of the fourth left and right guide sprockets 324 at the same internal respectively.

In this way, the first to fifth left and right guide sprockets 321 to 325 may be arranged at equal horizontal intervals, and thus the left and right cultivation gutters 40 and 40' coupled to the left and right ends of the first to fifth elevating chains may be maintained at equal intervals.

FIGS. 13A and 13B are front and plan views illustrating a partially extracted and enlarged state of a first elevating member in FIG. 11.

The first elevating chain 311 of the first elevating member 31 is installed such that the middle part interlocks with the bottom portion of the first sprocket 231 and the left and right parts are directed upward, interlock with the top portions of the first left and right guide sprockets, and are directed downward from left and right sides of the top portions thereof respectively.

In this way, when the deceleration motor 21 is driven forward and the first sprocket 231 rotates clockwise by the drive shaft 22, the middle part of the first elevating chain 311 moves to the left so that the right part ascends and the left part descends in accordance with guidance of the first left and right guide sprockets 321, and thus the left cultivation gutter 40 descends and the right cultivation gutter 40' ascends. On the contrary, when the deceleration motor is driven backward and the first sprocket rotates counterclockwise, the middle part of the first elevating chain moves to the right so that the right cultivation gutter descends and the left cultivation gutter ascends.

When the cultivation gutters 40 and 40' ascend and descend as described above, the first elevating chain 311 is held by more teeth of the bottom portion of the first sprocket and a lot of teeth of the top portions of the first left and right guide sprockets due to a greater height difference between the first sprocket 231 and the first left and right guide sprockets 321. Thus, a driving force of the drive shaft 22 is entirely transferred thereto enabling the left and right cultivation gutters to ascend and descend smoothly and accurately without any deviation.

FIGS. 14A and 14B are front and plan views illustrating a partially extracted and enlarged state of second and third elevating members in FIG. 11.

The second elevating chain 312 of the second elevating member 32 is installed such that the middle part interlocks with the top portion of the second sprocket 232 and the left and right are directed downward, interlock with the bottom portions of the first left and right auxiliary sprockets 241, interlock with the top portions of the second left and right guide sprockets 322, and are directed downward from left and right sides thereof respectively.

In this way, when the deceleration motor 21 is driven forward and the second sprocket 232 rotates clockwise by the drive shaft 22, the middle part of the second elevating chain 312 moves to the right so that the left part ascends and the right part descends in accordance with guidance of the first left and right auxiliary sprockets 241 and the second left and right guide sprockets 322, and thus the left cultivation gutter 40' ascends and the right cultivation gutter 40' descends. On the contrary, when the deceleration motor is driven backward and the second sprocket rotates counterclockwise, the middle part of the second elevating chain moves to the left so that the right cultivation gutter ascends and the left cultivation gutter descends When the cultivation gutters 40 and 40' ascend and descend as described above, the second elevating chain 312 moves in a state of being securely held by teeth of the top portion of the second sprocket 232, the bottom portions of the first left and right auxiliary sprockets 241, and the top portions of the second left and right guide sprockets 322 in spite of less height differences among the second sprocket 232, the first left and right auxiliary sprockets 241, and the second left and right guide sprockets 322 since the held portions are alternated between the top portions and the bottom portions. Thus, the driving force of the drive shaft 22 is entirely transferred thereto enabling the left and right cultivation gutters to ascend and descend smoothly and accurately without any deviation.

Meanwhile, the third elevating chain 313 of the third elevating member 33 is installed such that the middle part interlocks with the bottom portion of the third sprocket 233 and the left and right parts are directed upward, interlock with the top portions of the second left and right auxiliary sprockets 242, and are directed downward from left and right sides of the top portions of the third left and right guide sprockets 323 respectively.

In this way, when the deceleration motor 21 is driven forward and the third sprocket 233 rotates clockwise by the drive shaft 22, the middle part of the third elevating chain 313 moves to the left so that the left part descends and the right part ascends in accordance with guidance of the second left and right auxiliary sprockets 242 and the third left and right guide sprockets 323, and thus the left cultivation gutter 40 descends and the right cultivation gutter 40' ascends. On the contrary, when the deceleration motor is driven backward and the third sprocket rotates counterclockwise, the middle part of the third elevating chain moves to the right so that the right cultivation gutter descends and the left cultivation gutter ascends.

When the cultivation gutters 40 and 40' ascend and descend as described above, the third elevating chain 313 moves in a state of being securely held by teeth of the bottom portion of the third sprocket 233, the top portions of the second left and right auxiliary sprockets 242, and the top portions of the third left and right guide sprockets 323 in spite of less height differences among the third sprocket 233, the second left and right auxiliary sprockets 242, and the third left and right guide sprockets 323 since the held portions are alternated between the top portions and the bottom portions. Thus, the driving force of the drive shaft 22 is entirely transferred thereto enabling the left and right cultivation gutters to ascend and descend smoothly and accurately without any deviation.

FIGS. 15A and 15B are font and plan views illustrating a partially extracted and enlarged state of fourth and fifth elevating members in FIG. 11.

The fourth elevating chain 314 of the fourth elevating member 34 is installed such that the middle part interlocks with the top portion of the fourth sprocket 234 and the left and right pails are directed downward, interlock with the bottom portions of the third left and right auxiliary sprockets 243, interlock with the top portions of the fourth left and right guide sprockets 324, and are directed downward from left and right sides thereof respectively.

In this way, when the deceleration motor 21 is driven forward and the fourth sprocket 234 rotates clockwise by the drive shaft 22, the middle part of the fourth elevating chain 314 moves to the right so that the left part ascends and the right pail descends in accordance with guidance of the third left and right auxiliary sprockets 243 and the fourth left and right guide sprockets 324, and thus the left cultivation gutter 40 ascends and the right cultivation gutter 40' descends. On the contrary, when the deceleration motor is driven backward and the fourth sprocket rotates counterclockwise, the middle part of the fourth elevating chain moves to the left so that the right cultivation gutter ascends and the left cultivation gutter descends.

When the cultivation gutters 40 and 40' ascend and descend as described above, the fourth elevating chain 314 moves in a state of being securely held by teeth of the top portion of the fourth sprocket 234, the bottom portions of the third left and right auxiliary sprockets 243, and the top portions of the fourth left and right guide sprockets 324 in spite of less height differences among the fourth sprocket 234, the third left and right auxiliary sprockets 243, and the fourth left and right guide sprockets 324 since the held portions are alternated between the top portions and the bottom portions. Thus, the driving force of the drive shaft 22 is entirely transferred thereto enabling the left and right cultivation gutters to ascend and descend smoothly and accurately without any deviation.

Meanwhile, the fifth elevating chain 315 of the fifth elevating member 35 is installed such that the middle part interlocks with the bottom portion of the fifth sprocket 235 and the left and right parts are directed upward, interlock with the top portions of the fourth left and right auxiliary sprockets 244 and top portions of the fifth left and right guide sprockets 325, and are directed downward from left and right sides of the top portions thereof respectively.

In this way, when the deceleration motor 21 is driven forward and the fifth sprocket 235 rotates clockwise by the drive shaft 22, the middle part of the fifth elevating chain 315 moves to the left so that the left pail descends and the right part ascends in accordance with guidance of the fourth left and right auxiliary sprockets 244 and the fifth left and right guide sprockets 325, and thus the left cultivation gutter 40 descends and the right cultivation gutter 40' ascends. On the contrary, when the deceleration motor is driven backward and the fifth sprocket rotates counterclockwise, the middle part of the fifth elevating chain moves to the right so that the right cultivation gutter descends and the left cultivation gutter ascends.

When the cultivation gutters 40 and 40' ascend and descend as described above, the fifth elevating chain 315 moves in a state of being securely held by teeth of the bottom portion of the fifth sprocket 235, the top portions of the fourth left and right auxiliary sprockets 244, and the top portions of the fifth left and right guide sprockets 325 in spite of less height differences among the fifth sprocket 235, the fourth left and right auxiliary sprockets 244, and the fifth left and right guide sprockets 325 since the held portions are alternated between the top portions and the bottom portions. Thus, the driving force of the drive shaft 22 is entirely transferred thereto enabling the left and right cultivation gutters to ascend and descend smoothly and accurately without any deviation.

FIGS. 16A and 16B are front views illustrating a state where heights of cultivation gutters in FIG. 9 are differently adjusted9.

When the first to fifth sprockets 231 to 235 simultaneously rotate clockwise by the drive shaft 22 in response to the forward driving of the deceleration motor 21 in a state where the left and right cultivation gutters 40 and 40' of the first to fifth elevating members 31 to 35 are positioned on the same horizontal line at the same height as illustrated in FIG. 9, the middle parts of the first, third, and fifth elevating chains 311, 313, and 315 move to the left simultaneously and the second and fourth elevating chains 312 and 314 move to the right simultaneously.

In this case, the left cultivation gutters 40 respectively coupled to the left ends of the first, third, and fifth elevating chains 311, 313, and 315 descend simultaneously and the right cultivation gutters 40' respectively coupled to the right ends thereof ascend simultaneously, while the left cultivation gutters 40 respectively coupled to the left ends of the second and fourth elevating chains 312 and 314 ascend simultaneously and the right cultivation gutters 40' respectively coupled to the right ends thereof descend simultaneously. Thus, the left and right cultivation gutters ascend and descend alternately in turn in the zigzag shape by using only one deceleration motor 21 and one drive shaft 22 to form a passage for workers as illustrated in FIG. 16A.

Also, when the first to fifth sprockets 231 to 235 simultaneously rotate counterclockwise by the drive shaft 22 in response to the backward driving of the deceleration motor 21 in a state where the left and right cultivation gutters 40 and 40' of the first to fifth elevating members 31 to 35 are positioned on the same horizontal line at the same height as illustrated in FIG. 9, the middle parts of the first, third, and fifth elevating chains 311, 313, and 315 move to the right simultaneously and the second and fourth elevating chains 312 and 314 move to the left simultaneously. Thus, the left cultivation gutters respectively coupled to the left ends of the first, third, and fifth elevating chains ascend simultaneously and the right cultivation gutters respectively coupled to the right ends thereof descend simultaneously, while the left cultivation gutters respectively coupled to the left ends of the second and fourth elevating chains descend simultaneously and the right cultivation gutters respectively coupled to the right ends thereof ascend simultaneously as illustrated in FIG. 16B. Thus, the left and right cultivation gutters ascend and descend alternately in turn in the zigzag shape by using only one deceleration motor 21 and one drive shaft 22 to form a passage for workers.

The plant cultivation apparatuses using the up-down system according to the first and second exemplary embodiments of the present invention are configured such that the first elevating chain 311 to the fifth elevating chain 315 simultaneously directed upward and downward alternately in turn toward upper positions and lower positions than the drive shaft 22 in a zigzag shape.

Meanwhile, although it has been described that the elevating unit 30 is configured with a set of five sprockets, i.e., first to fifth elevating members 31 to 35, the present invention is not limited thereto. The elevating units each configured with a set of three, four, or more elevating members may also be continuously aligned horizontally or vertically in accordance of widthwise and lengthwise areas of the inside of the greenhouse 10 in which the elevating units will be installed. It is obvious that such modifications are included within the scope of the invention.

Also, the first to fifth left and right guide sprockets 321 to 325 may be axially installed inside anti-dislocation brackets 36 having open left and right sides and configured to prevent the first to fifth elevating chains 311 to 315 interlocking with the first to fifth left and right guide sprockets from being dislocated from moving paths thereof.

FIG. 17 is a schematic front view illustrating a portion of a greenhouse in which a plant cultivation apparatus using an up-down system according to a third exemplary embodiment is installed. FIG. 18 is a plan view illustrating the plant cultivation apparatus using the up-down system of FIG. 17 from which some elements are omitted.

The plant cultivation apparatus using the up-down system according to the third exemplary embodiment of the present invention illustrated in FIGS. 17 and 18 includes a driving unit 20 installed at trusses 12 installed at regular intervals in a forward and backward direction to horizontally cross tops of pillars 11 of a greenhouse 10 having a general roof structure widely used in the art, an elevating unit 30 installed to ascend and descend by the driving unit, and cultivation gutters 40 and 40' respectively hanging from left and right parts of the elevating unit.

FIG. 19 is a front view illustrating an enlarged portion of FIG. 17. FIGS. 20A and 20B are enlarged plan and side views of FIG. 19. FIG. 21 is a front view illustrating a state where heights of cultivation gutters are adjusted in FIG. 17.

The driving unit 20 may include a deceleration motor 21, a drive shaft 22 installed on the bottoms of middle crossbars 121 of the trusses 12 with a bearing to cross the middle crossbars 121 in the forward and backward direction and rotating forward and backward by the deceleration motor, and reel members 23' axially fixed to the drive shaft at regular intervals in the forward and backward direction, having a spiral winding groove 231' on the outer surface thereof, and having a predetermined length.

The reel member 23' is installed on the bottom of the middle crossbar 121 with the bearing 13 at a portion corresponding to the drive shaft 22 such that the middle crossbar 121 is located in the middle of the reel member 23'.

In this way, loads of the cultivation gutters 40 and 40' which are respectively hung on the reel member 23' are not concentrated on the drive shaft 22 but distributed by the bearing 13, which will be described later, and thus shaft deformation or the like does not occur even after long-term use.

The elevating unit 30 includes first to fifth elevating members 31 to 35.

The first to fifth elevating members 31 to 35 includes first to fifth elevating wires 311' to 315' having middle parts spirally wound several times at predetermined portions of the winding groove 231' spirally formed on the reel member 23' to be isolated from each other and left right ends to which cultivation gutters 40 and 40' are coupled, and first to fifth left and right guide pulleys 321' to 325' on which left and right parts of the first to fifth elevating wires are hung downward respectively.

Meanwhile, the left and right parts of the first to fifth elevating wires 311' to 315' are wound around the winding groove or released therefrom at different positions of left and right sides of the reel member 23' in accordance with portions of the winding groove 231' around which the middle parts are wound several times. Thus, the first to fifth left and right guide pulleys 321' to 325' are installed at the truss 12 to be isolated from each other in the forward and backward direction at intervals corresponding to the positions where the left and right parts of the first to fifth elevating wires are wound around or released from the winding groove.

The first left and right guide pulleys 321' of the first elevating member 31 are installed on the top of the middle crossbar 121 at rear left and right portions thereof to be located at upper positions than the drive shaft 22 and spaced apart from left and right sides of the drive shaft 22 at the same interval respectively. The first elevating wire 311' is installed such that the middle part is spirally wound several times around a rear end portion of the winding groove 231', the left part is directed upward from a front lower portion of the left side, hung on a top portion of the first left guide pulley located at a front position between the first left and right guide pulleys, and directed downward from a left side of the top portion thereof, and the right part is directed upward from a rear lower portion of the right side, hung on a top portion of the first right guide pulley located at a rear position, and directed downward from a right side of the top portion thereof.

In this way, when the deceleration motor 21 is driven forward and the reel member 23' rotates clockwise by the drive shaft 22, a front portion of the middle part of the first elevating wire 311' wound around the winding groove 231' is released to the left and a rear portion of the middle part is wound to the left so that the first elevating wire moves to the left, and thus the right pail of the first elevating wire ascends and the left part thereof descends in accordance with guidance of the first left and right guide pulleys 321', and the left cultivation gutter 40 descends and the right cultivation gutter 40' ascends. On the contrary, when the deceleration motor is driven backward and the reel member rotates counterclockwise, the front portion of the middle part of the first elevating wire is wound to the right and the rear portion of the middle part is released to the right so that the first elevating wire moves to the right, and thus the right cultivation gutter descends and the left cultivation gutter ascends.

The second left and right guide pulleys 322' of the second elevating member 32 are installed on the top of the lower crossbar 122 at front left and right portions thereof to be located at lower positions than the first left and right guide pulleys 321' and spaced apart from left and right sides of the first left and right guide pulleys 321' at the same interval respectively. The second elevating wire 312' is installed such that the middle part is spirally wound several times around a front end portion of the winding groove 231', a left part is directed downward from a rear upper portion of the left side, hung on a top portion of the second left guide pulley located at a rear position between the second left and right guide pulleys, and directed downward from a left side of the top portion thereof, and a right part is directed downward from a rear upper portion of the right side, hung on a top portion of the second right guide pulley located at a front position, and directed downward from a right side of the top portion thereof.

In this way, when the deceleration motor 21 is driven forward and the reel member 23' rotates clockwise by the drive shaft 22, a front portion of the middle part of the second elevating wire 312' wound around the winding groove 231' is released to the right and a rear portion of the middle part is wound to the right so that the second elevating wire moves to the right, and thus the right part of the second elevating wire descends and the left part thereof ascends in accordance with guidance of the second left and right guide pulleys 322', and the left cultivation gutter 40 ascends and the right cultivation gutter 40' descends. On the contrary, when the deceleration motor is driven backward and the reel member rotates counterclockwise, the front portion of the middle part of the second elevating wire is wound to the left and the rear portion of the middle part is released to the left so that the second elevating wire moves to the left, and thus the right cultivation gutter ascends and the left cultivation gutter descends.

The third left and right guide pulleys 323' of the third elevating member 33 are installed on the top of the middle crossbar 121 at front left and right portions thereof to be located at upper positions than the second left and right guide pulleys 322' and spaced apart from left and right sides of the second left and right guide pulleys 322' at the same interval respectively. The third elevating wire 313' is installed such that the middle part is spirally wound several times around the winding groove 231' to be isolated from the rear portion of the middle part of the second elevating wire 312', a left part is directed upward from a front lower portion of the left side, hung on a top portion of the third left guide pulley located at a front position between the third left and right guide pulleys, and directed downward from a left side of the top portion thereof, and a right part is directed upward from a rear lower portion of the right side, hung on a top portion of the third right guide pulley located at a rear position, and directed downward from a right side of the top portion thereof.

In this way, when the deceleration motor 21 is driven forward and the reel member 23' rotates clockwise by the drive shaft 22, a front portion of the middle part of the third elevating wire 313' wound around the winding groove 231' is released to the left and a rear portion of the middle part is wound to the left so that the third elevating wire moves to the left, and thus the right pail of the third elevating wire ascends and the left part thereof descends in accordance with guidance of the third left and right guide pulleys 323', and the left cultivation gutter 40 descends and the right cultivation gutter 40' ascends. On the contrary, when the deceleration motor is driven backward and the reel member rotates counterclockwise, the front portion of the middle part of the third elevating wire is wound to the right and the rear portion of the middle part is released to the right so that the third elevating wire moves to the right, and thus the right cultivation gutter descends and the left cultivation gutter ascends.

The fourth left and right guide pulleys 324' of the fourth elevating member 34 are installed on the top of the lower crossbar 122 at rear left and right portions thereof to be located at lower positions than the third left and right guide pulleys 323' and spaced apart from left and right sides of the third left and right guide pulleys 323' at the same interval respectively. The fourth elevating wire 314' is installed such that the middle part is spirally wound several times around the winding groove 231' to be isolated from the front portion of the middle part of the first elevating wire 311', the left part is directed downward from a rear upper portion of the left side, hung on a top portion of the fourth left guide pulley located at a rear position between the fourth left and right guide pulleys, and directed downward from a left side of the top portion thereof, and a right part is directed downward from a rear upper portion of the right side, hung on a top portion of the fourth right guide pulley located at a front position, and directed downward from a right side of the top portion thereof.

In this way, when the deceleration motor 21 is driven forward and the reel member 23' rotates clockwise by the drive shaft 22, a front portion of the middle part of the fourth elevating wire 314' wound around the winding groove 231' is released to the right and a rear portion of the middle part is wound to the right so that the fourth elevating wire moves to the right, and thus the right part of the fourth elevating wire descends and the left part thereof ascends in accordance with guidance of the fourth left and right guide pulleys 324', and the left cultivation gutter 40 ascends and the right cultivation gutter 40' descends. On the contrary, when the deceleration motor is driven backward and the reel member rotates counterclockwise, the front portion of the middle part of the fourth elevating wire is wound to the left and the rear portion of the middle part is released to the left so that the fourth elevating wire moves to the left, and thus the right cultivation gutter ascends and the left cultivation gutter descends.

The fifth left and right guide pulleys 325' of the fifth elevating member 35 are installed on the top of the middle crossbar 121 at front and rear sides thereof to be located at upper positions than the fourth left and right guide pulleys 324' and spaced apart from left and right sides of the fourth left and right guide pulleys 324' at the same interval respectively. The fifth elevating wire 315' is installed such that the middle part is spirally wound several times around the winding groove 231' in a state where the middle part is isolated from the rear portion of the middle part of the third elevating wire 313' and the front portion of the fourth elevating wire 314', a left part is directed upward from a front lower portion of the left side, hung on a top portion of the fifth left guide pulley located at a front position between the fifth left and right guide pulleys, and directed downward from a left side of the top portion thereof, and a right part is directed upward from a rear lower portion of the right side, hung on a top portion of the fifth right guide pulley located at a rear position, and directed downward from a right side of the top portion thereof.

In this way, when the deceleration motor 21 is driven forward and the reel member 23' rotates clockwise by the drive shaft 22, a front portion of the middle part of the fifth elevating wire 315' wound around the winding groove 231' is released to the left and a rear portion of the middle part thereof is wound to the left so that the fifth elevating wire moves to the left, and thus the right part of the fifth elevating wire ascends and the left part thereof descends in accordance with guidance of the fifth left and right guide pulleys 325', and the left cultivation gutter 40 descends and the right cultivation gutter 40' ascends. On the contrary, when the deceleration motor is driven backward and the reel member rotates counterclockwise, the front portion of the middle part of the fifth elevating wire is wound to the right and the rear portion of the middle part is released to the right so that the fifth elevating wire moves to the right, and thus the right cultivation gutter descends and the left cultivation gutter ascends.

When the first to fifth elevating members 31 to 35 are installed as described above, the left and right cultivation gutters 40 and 40' of the first to fifth elevating members may ascend and descend alternately in turn in a zigzag shape with the aid of only one deceleration motor 21 and one drive shaft 22.

That is, when the reel member 23' rotates clockwise by the drive shaft 22 in response to the forward driving of the deceleration motor 21 in a state where the left and right cultivation gutters 40 and 40' of the first to fifth elevating members 31 to 35 are positioned on the same horizontal line at the same height as illustrated in FIG. 17, the middle parts of the first, third, and fifth elevating wires 311', 313', and 315' move to the left simultaneously and the second and fourth elevating wires 312' and 314' move to the right simultaneously.

In this case, the left cultivation gutters 40 respectively coupled to the left ends of the first, third, and fifth elevating wires 311', 313', and 315' descend simultaneously and the right cultivation gutters 40' respectively coupled to the right ends thereof ascend simultaneously, while the left cultivation gutters 40 respectively coupled to the left ends of the second and fourth elevating wires 312' and 314' ascend simultaneously and the right cultivation gutters 40' respectively coupled to the right ends thereof descend simultaneously. Thus, the left and right cultivation gutters simultaneously ascend and descend alternately in turn in the zigzag shape by using only one deceleration motor 21, one drive shaft 22, and one real member 23' to form a passage for workers as illustrated in FIG. 18.

Meanwhile, although it has been described that the elevating unit 30 is configured with a set of five elevating members, i.e., first to fifth elevating members 31 to 35, the present invention is not limited thereto. The elevating units each configured with a set of three, four, or more elevating members may also be continuously aligned horizontally or vertically in accordance of widthwise and lengthwise areas of the inside of the greenhouse 10 in which the elevating units will be installed. Also, the front and rear portions where the first to fifth elevating members are installed may be modified, if required. It is obvious that such modifications are included within the scope of the invention.

Also, the first to fifth left and right guide pulleys 321' to 325' may be axially installed inside anti-dislocation brackets 36 having open left and right sides and configured to prevent the first to fifth elevating wires 311' to 315' hung on the first to fifth left and right guide pulleys from being dislocated from moving paths thereof.

Since the cultivation gutters 40 and 40' ascend and descend by leftward and rightward movement of the middle parts of the first to fifth elevating wires 311' to 315' which are spirally wound several times around predetermined portions of the winding groove 231' of the reel member 23', the first to fifth elevating wires does not slip during leftward and rightward movement thereof. Thus, a driving force of the drive shaft 22 is entirely transferred thereto enabling the cultivation gutters to ascend and descend smoothly and accurately without any deviation.

According to the first to third exemplary embodiments of the present invention, the left and right cultivation gutters 40 and 40' respectively coupled to the left and right ends of the first to fifth elevating members ascend and descend alternately in turn in a zigzag shape from a state where the left and right cultivation gutters 40 and 40' are aligned on the same horizontal line at the same height by simultaneously operating the first to fifth elevating members 31 to 35 using only one deceleration motor 21 and one drive shaft 22. Thus, the plant cultivation apparatus using the up-down system according to the present invention has a simple structure and may be installed and maintained with lower costs, thereby reducing production costs resulting in decrease in cost burden of producers and consumers.

[Description of Symbols]

| | | | |
|---|---|---|---|
| 10: | greenhouse | 12: | truss |
| 20: | driving unit | 21: | deceleration motor |
| 22: | drive shaft | 23: | driving sprocket member |
| 23': | reel member | | |
| 31~35: | first to fifth elevating members | 30: | elevating unit |
| 36: | anti-dislocation bracket | | |
| 40, 40': | cultivation gutter | | |
| 231~235: | first to fifth sprockets | | |
| 231': | winding groove | | |
| 241~244: | first to fourth left and right auxiliary sprockets | | |
| 311~315: | first to fifth elevating chains | | |
| 311'~315': | first to fifth elevating wires | | |
| 321~325: | first to fifth left and right guide sprockets | | |
| 321'~325': | first to fifth left and right guide pulleys | | |

The invention claimed is:

1. A plant cultivation apparatus using an up-down system comprising a driving unit 20 installed at trusses 12 installed at regular intervals in a forward and backward direction to horizontally cross tops of inner pillars 11 of a greenhouse 10, an elevating unit 30 installed to operate by the driving unit 20, and left and right cultivation gutters 40 and 40' configured to ascend and descend by the elevating unit 30, wherein the driving unit 20 comprises a deceleration motor 21, a drive shaft 22 axially installed on the bottoms of middle crossbars 121 of the trusses 12 to cross the middle crossbars 121 in the forward and backward direction and rotating by the deceleration motor 21, and driving sprocket members 23 each configured with a set of five sprockets of first to fifth sprockets 231 to 235 and axially installed at the drive shaft 22 at regular intervals in the forward and backward direction;

the elevating unit 30 is configured with a set of five elevating members of first to fifth elevating members 31 to 35;

the first elevating member 31 comprises first left and right guide sprockets 321 installed on the top of the middle crossbar 121 of the truss 12 to be located at upper positions than the drive shaft 22 and spaced apart from left and right sides of the drive shaft 22 at the same interval respectively and a first elevating chain 311 having a middle part interlocking with a bottom portion of the first sprocket 231, left and right parts interlocking with top portions of the first left and right guide sprockets 321 and directed downward from left and right sides of the top portions thereof respectively, and left and right ends to which cultivation gutters 40 and 40' are coupled respectively;

the second elevating member 32 comprises second left and right guide sprockets 322 installed on the top of a lower crossbar 122 of the truss 12 to be located at lower positions than the first left and right guide sprockets 321 and spaced apart from left and right sides thereof at the same interval respectively and a second elevating chain 312 having a middle part interlocking with a top portion of the second sprocket 232, left and right parts interlocking with top portions of the second left and right guide sprockets 322 and directed downward from left and right sides of the top portions thereof respectively, and left and right ends to which cultivation gutters 40 and 40' are coupled respectively;

the third elevating member 33 comprises third left and right guide sprockets 323 installed on the top of the middle crossbar 121 to be located at upper positions than the second left and right guide sprockets 322 and spaced apart from left and right sides thereof at the same interval respectively and a third elevating chain 313 having a middle part interlocking with a bottom portion of the third sprocket 233, left and right parts interlocking with top portions of the third left and right guide sprockets 323 and directed downward from left and right sides of the top portions thereof respectively, and left and right ends to which cultivation gutters 40 and 40' are coupled;

the fourth elevating member 34 comprises fourth left and right guide sprockets 324 installed on the top of the lower crossbar 122 to be located at lower positions than the third left and right guide sprockets 323 and spaced apart from left and right sides thereof at the same interval respectively and a fourth elevating chain 314 having a middle part interlocking with a top portion of the fourth sprocket 234, left and right parts interlocking with top portions of the fourth left and right guide sprockets 324 and directed downward from left and right sides of the top portions thereof respectively, and left and right ends to which cultivation gutters 40 and 40' are coupled respectively; and the fifth elevating member 35 comprises fifth left and right guide sprockets 325 installed on the top of the middle crossbar 121 to be located at upper positions than the fourth left and right guide sprockets 324 and spaced apart from left and right sides thereof at the same interval respectively and a fifth elevating chain 315 having a middle part interlocking with a bottom portion of the fifth sprocket 235, left and right parts interlocking with top portions of the fifth left and right guide sprockets 325 and directed downward from left and right sides of the top portions thereof respectively, and left and right ends to which cultivation gutters 40 and 40' are coupled respectively, wherein the left and right cultivation gutters 40 and 40' of the first to fifth elevating members 31 to 35 ascend and descend alternately in turn in a zigzag shape by using one deceleration motor 21 and one drive shaft 22.

2. A plant cultivation apparatus using an up-down system comprising a driving unit 20 installed at trusses 12 installed at regular intervals in a forward and backward direction to horizontally cross tops of inner pillars 11 of a greenhouse 10, an elevating unit 30 installed to operate by the driving unit 20, and left and right cultivation gutters 40 and 40' configured to ascend and descend by the elevating unit 30, wherein the driving unit 20 comprises a deceleration motor 21, a drive shaft 22 axially installed on the bottoms of middle crossbars 121 of the trusses 12 to cross the middle crossbars 121 in the forward and backward direction and rotating by the deceleration motor 21, driving sprocket members 23 each configured with a set of five sprockets of first to fifth sprockets 231 to 235 and axially installed at the drive shaft 22 at regular intervals in the forward and backward direction, and first to fourth left and right auxiliary sprockets 241 to 244 installed to be adjacent to left and right sides of the second to fifth sprockets 232 to 235 respectively;

the elevating unit 30 is configured with a set of five elevating members of first to fifth elevating members 31 to 35;

the first elevating member 31 comprises first left and right guide sprockets 321 installed on the top of the middle crossbar 121 of the truss 12 to be located at upper positions than the drive shaft 22 and spaced apart from left and right sides of the drive shaft 22 at the same interval respectively and a first elevating chain 311 having a middle part interlocking with a bottom portion of the first sprocket 231, left and right parts interlocking with top portions of the first left and right guide sprockets 321 and directed downward from left and right sides of the top portions thereof respectively, and left and right ends to which cultivation gutters 40 and 40' are coupled respectively;

the second elevating member 32 comprises second left and right guide sprockets 322 installed on the top of a lower crossbar 122 of the truss 12 to be located at lower positions than the first left and right guide sprockets 321 and spaced apart from left and right sides thereof at the same interval respectively and a second elevating chain 312 having a middle part interlocking with a top portion of the second sprocket 232, left and right parts interlocking with bottom portions of the first left and right auxiliary sprockets and top portions of the second left and right guide sprockets 322 and directed downward from left and right sides of the top portions of the second left and right guide sprockets 322 respectively, and left and right ends to which cultivation gutters 40 and 40' are coupled respectively;

the third elevating member 33 comprises third left and right guide sprockets 323 installed on the top of the middle crossbar 121 to be located at upper positions than the second left and right guide sprockets 322 and spaced apart from left and right sides thereof at the same interval respectively and a third elevating chain 313 having a middle part interlocking with a bottom portion of the third sprocket 233, left and right parts interlocking with top portions of the second left and right auxiliary sprockets 242 and top portions of the third left and right guide sprockets 323 and directed downward from left and right sides of the top portions of the third left and right guide sprockets 323 respectively, and left and right ends to which cultivation gutters 40 and 40' are coupled respectively;

the fourth elevating member 34 comprises fourth left and right guide sprockets 324 installed on the top of the lower crossbar 122 to be located at lower positions than the third left and right guide sprockets 323 and spaced apart from left and right sides thereof at the same interval respectively and a fourth elevating chain 314 having a middle part interlocking with a top portion of the fourth sprocket 234, left and right parts interlocking with bottom portions of the third left and right auxiliary sprockets 243 and top portions of the fourth left and right guide sprockets 324 and directed downward from left and right sides of the top portions of the fourth left and right guide sprockets 324 respectively, and left and right ends to which cultivation gutters 40 and 40' are coupled respectively; and the fifth elevating member 35 comprises fifth left and right guide sprockets 325 installed on the top of the middle crossbar 121 to be located at upper positions than the fourth left and right guide sprockets 324 and spaced apart from left and right sides thereof at the same interval respectively and a fifth elevating chain 315 having a middle part interlocking with a bottom portion of the fifth sprocket 235, left and right parts interlocking with top portions of the fourth left and right auxiliary sprockets 244 and top portions of the fifth left and right guide sprockets 325 and directed downward from left and right sides of the top portions of the fifth left and right guide sprockets 325 respectively, and left and right ends to which cultivation gutters 40 and 40' are coupled respectively, wherein the left and right cultivation gutters 40 and 40' of the first to fifth elevating members 31 to 35 ascend and descend alternately in turn in a zigzag shape by using one deceleration motor 21 and one drive shaft 22.

3. The plant cultivation apparatus according to claim 2, wherein the first to fifth sprockets 231 to 235 are formed separately or divided into one group of two sprockets and the other group of three sprockets, and the first to fifth elevating chains 311 to 315 are configured to be simultaneously directed upward and downward alternately in turn toward upper positions and lower positions than the drive shaft 22 in a zigzag shape.

4. The plant cultivation apparatus according to claim 2, wherein the first to fifth elevating members 31 to 35 further comprise anti-dislocation brackets 36 in which the first to fifth left and right guide sprockets 321 to 325 are installed to prevent the first to fifth elevating chains 311 to 315 from being dislocated from moving paths thereof.

5. A plant cultivation apparatus using an up-down system comprising a driving unit 20 installed at trusses 12 installed at regular intervals in a forward and backward direction to horizontally cross tops of inner pillars 11 of a greenhouse 10, an elevating unit 30 installed to operate by the driving unit 20, and left and right cultivation gutters 40 and 40' configured to ascend and descend by the elevating unit 30, wherein the driving unit 20 comprises a deceleration motor 21, a drive shaft 22 axially installed on the bottoms of middle crossbars 121 of the trusses 12 to cross the middle crossbars 121 in the forward and backward direction and rotating by the deceleration motor 21, and reel members 23' axially installed at the drive shaft 22 at regular intervals and having a spiral winding groove 231';

the elevating unit 30 is configured with a set of five elevating members of first to fifth elevating members 31 to 35;

the first elevating member 31 comprises first left and right guide pulleys 321' installed on the top of the middle crossbar 121 of the truss 12 at rear left and right portions thereof to be located at upper positions than the drive shaft 22 and spaced apart from left and right sides of the drive shaft 22 at the same interval respectively and a first elevating wire 311' having a middle part spirally wound several times around a rear end portion of the winding groove 231', a left part directed upward from a front lower portion of the left side, hung on a top portion of the first left guide pulley 321' located at a front position between the first left and right guide pulleys 321', and directed downward from a left side of the top portion thereof, and a right pail directed upward from a rear lower portion of the right side, hung on a top portion of the first right guide pulley 321' located at a rear position, and directed downward from a right side of the top portion thereof;

the second elevating member 32 comprises second left and right guide pulleys 322' installed on the top of a lower crossbar 122 of the truss 12 at front left and right positions thereof to be located at lower positions than the first left and right guide pulleys 321' and spaced apart from left and right sides thereof at the same interval respectively and a second elevating wire 312' having a middle part spirally wound several times around a front end portion of the winding groove 231', a left part directed downward from a rear upper portion of the left side, hung on a top portion of the second left guide pulley 322' located at a rear position between the second left and right guide pulleys 322', and directed downward from a left side of the top portion thereof, and a right part directed downward from a rear upper portion of the right side, hung on a top portion of the second right guide pulley 322', and directed downward from a right side of the top portion thereof;

the third elevating member 33 comprises third left and right guide pulleys 323' installed on the top of the middle crossbar 121 at front left and right portions thereof to be located at upper positions than the second left and right guide pulleys 322' and spaced apart from left and right sides thereof at the same interval respectively and a third elevating wire 313' having a middle part spirally wound several times around the winding groove 231' to be isolated from the rear portion of the middle part of the second elevating wire 312', a left part directed upward from a front lower portion of the left side, hung on a top portion of the third left guide pulley 323' located at a front position between the third left and right guide pulleys 323', and directed downward from a left side of the top portion thereof, and a right part directed upward from a rear lower portion of the right side, hung on a top portion of the third right guide pulley 323' located at a rear position, and directed downward from a right side of the top portion thereof;

the fourth elevating member 34 comprises fourth left and right guide pulleys 324' installed on the top of a lower crossbar 122 at rear left and right positions thereof to be located at lower positions than the third left and right guide pulleys 323' and spaced apart from left and right sides thereof at the same interval respectively and a fourth elevating wire 314' having a middle part spirally wound several times around the winding groove 231' to be isolated from the front portion of the middle part of the first elevating wire 311', a left part directed downward from a rear upper portion of the left side, hung on a top portion of the fourth left guide pulley 324' located at a rear position between the fourth left and right guide pulleys 324', and directed downward from a left side of the top portion thereof, and a right part directed downward from a rear upper portion of the right side, hung on a top portion of the fourth right guide pulley 324' located at a front position, and directed downward from a right side of the top portion thereof; and the fifth elevating member 35 comprises fifth left and right guide pulleys 325' installed on the top of the middle crossbar 121 at front and rear portions thereof to be located at upper positions than the fourth left and right guide pulleys 324' and spaced apart from left and right sides thereof at the same interval respectively and a fifth elevating wire 315' having a middle part spirally wound several times around the winding groove 231' in a state where the front portion of the middle part is isolated from the rear portion of the middle part of the third elevating wire 313' and the rear portion of the middle part is isolated from the front portion of the fourth elevating wire 314', a left part directed upward from a front lower portion of the left side, hung on a top portion of the fifth left guide pulley 325' located at a front position between the fifth left and right guide pulleys 325', and directed downward from a left side of the top portion thereof, and a right part directed upward from a rear lower portion of the right side, hung on a top portion of the fifth right guide pulley 323' located at a rear position, and directed downward from a right side of the top portion thereof, wherein the left and right cultivation gutters 40 and 40' of the first to fifth elevating members 31 to 35 ascend and descend alternately in turn in a zigzag shape by using one deceleration motor 21 and one drive shaft 22.

6. The plant cultivation apparatus according to claim 5, wherein the first to fifth elevating wires 311' to 315' are configured to be simultaneously directed upward and downward alternately in turn toward upper positions and lower positions than the drive shaft 22 in a zigzag shape.

7. The plant cultivation apparatus according to claim 5, wherein the first to fifth elevating members 31 to 35 further comprise anti-dislocation brackets 36 in which the first to fifth left and right guide pulleys 321' to 325' are installed to prevent the first to fifth elevating wires 311' to 315' from being dislocated from moving paths thereof.

\* \* \* \* \*